(12) United States Patent
Kobayashi

(10) Patent No.: US 11,082,670 B2
(45) Date of Patent: Aug. 3, 2021

(54) INFORMATION PROCESSING APPARATUS, INFORMATION PROCESSING METHOD, AND PROGRAM

(71) Applicant: SONY CORPORATION, Tokyo (JP)

(72) Inventor: Naoki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/621,947

(22) PCT Filed: Apr. 17, 2018

(86) PCT No.: PCT/JP2018/015872
§ 371 (c)(1),
(2) Date: Dec. 12, 2019

(87) PCT Pub. No.: WO2019/012774
PCT Pub. Date: Jan. 17, 2019

(65) Prior Publication Data
US 2020/0112707 A1    Apr. 9, 2020

(30) Foreign Application Priority Data
Jul. 14, 2017  (JP) .............................. JP2017-137886

(51) Int. Cl.
*H04N 9/31*         (2006.01)
*G03B 21/14*        (2006.01)

(52) U.S. Cl.
CPC ......... *H04N 9/3147* (2013.01); *G03B 21/142* (2013.01); *H04N 9/3194* (2013.01); *G09G 2320/0233* (2013.01)

(58) Field of Classification Search
CPC .. G03B 21/147; G03B 21/142; H04N 9/3194; H04N 9/3179; H04N 9/3182; H04N 9/3185; H04N 9/3188
See application file for complete search history.

(56) References Cited

U.S. PATENT DOCUMENTS

| | | | |
|---|---|---|---|
| 9,041,769 B2 * | 5/2015 | Bauer ................... | H05B 47/10 348/39 |
| 2006/0209268 A1 * | 9/2006 | Raskar ................ | G03B 21/142 353/69 |
| 2013/0070094 A1 | 3/2013 | Majumder et al. | |
| 2014/0285776 A1 * | 9/2014 | Inoue .................. | H04N 9/3185 353/69 |
| 2015/0055096 A1 | 2/2015 | Kim et al. | |
| 2015/0062445 A1 * | 3/2015 | Kim .................... | H04N 9/3182 348/744 |

FOREIGN PATENT DOCUMENTS

| | | |
|---|---|---|
| JP | 2005-024668 A | 1/2005 |
| JP | 2014-052393 A | 3/2014 |
| JP | 2015-047894 A | 3/2015 |
| JP | 2016-014720 A | 1/2016 |
| JP | 2016-536909 A | 11/2016 |

* cited by examiner

*Primary Examiner* — Ryan D Howard
(74) *Attorney, Agent, or Firm* — Paratus Law Group, PLLC

(57) ABSTRACT

There is provided an information processing apparatus, an information processing method, and a program that can alleviate a burden related to projector arrangement design. The information processing apparatus includes an arrangement control unit that outputs projector arrangement information associated with arrangement of a projector on the basis of a projection condition related to projection by the projector.

15 Claims, 11 Drawing Sheets

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/015872 (filed on Apr. 17, 2018) under 35 U.S.C. § 371, which claims priority to Japanese Patent Application No. 2017-137886 (filed on Jul. 14, 2017), which are all hereby incorporated by reference in their entirety.

TECHNICAL FIELD

The present disclosure relates to an information processing apparatus, an information processing method, and a program.

BACKGROUND ART

There is a projection system that projects an image with a plurality of projectors (see, for example, Patent Document 1 below). The projection system including a plurality of projectors as described above can project a single image, for example, by appropriately linking images projected by the respective projectors.

With the projection system including a plurality of projectors as described above, projection desired by a user cannot be performed unless the projectors are appropriately arranged, and, for example, there is a possibility that images projected by the respective projector cannot be linked. However, it is burdensome for the user to adjust the arrangement of real projectors while checking results of the projection, and in some cases, it is particularly difficult with a projection system including a large number of projectors.

Therefore, it is desirable that the user preliminarily design the arrangement of projectors and a screen, which is a projection destination. In order to assist such arrangement design, there is also a simulation tool that performs a simulation on the basis of information associated with the arrangement of the projectors and the screen and visualizes a virtual projection state of the projectors.

CITATION LIST

Patent Document

Patent Document 1: Japanese Patent Application Laid-Open No. 2016-14720

SUMMARY OF THE INVENTION

Problems to be Solved by the Invention

However, even if the aforementioned simulation tool is used, an operation of designing the arrangement of the projectors is a large burden on the user, and, in some cases, for example, it is difficult for the user who has less design experience to design appropriate arrangement.

Thus, the present disclosure proposes a novel and improved information processing apparatus, an information processing method, and a program that can alleviate a burden related to projector arrangement design.

Solutions to Problems

According to the present disclosure, there is provided an information processing apparatus including: an arrangement control unit that outputs projector arrangement information associated with arrangement of a projector on the basis of a projection condition related to projection by the projector.

Furthermore, according to the present disclosure, there is provided an information processing method including: outputting, by a processor, projector arrangement information associated with arrangement of a projector on the basis of a projection condition related to projection by the projector.

Furthermore, according to the present disclosure, there is provided a program causing a computer to achieve a function of: outputting, by a processor, projector arrangement information associated with arrangement of a projector on the basis of a projection condition related to projection by the projector.

Effects of the Invention

As described above, according to the present disclosure, it is possible to alleviate a burden related to projector arrangement design.

Note that the effects described above are not necessarily limitative. With or in place of the above effects, there may be achieved any one of the effects described in this specification or other effects that may be grasped from this specification.

MODE FOR CARRYING OUT THE INVENTION

Figure 1:
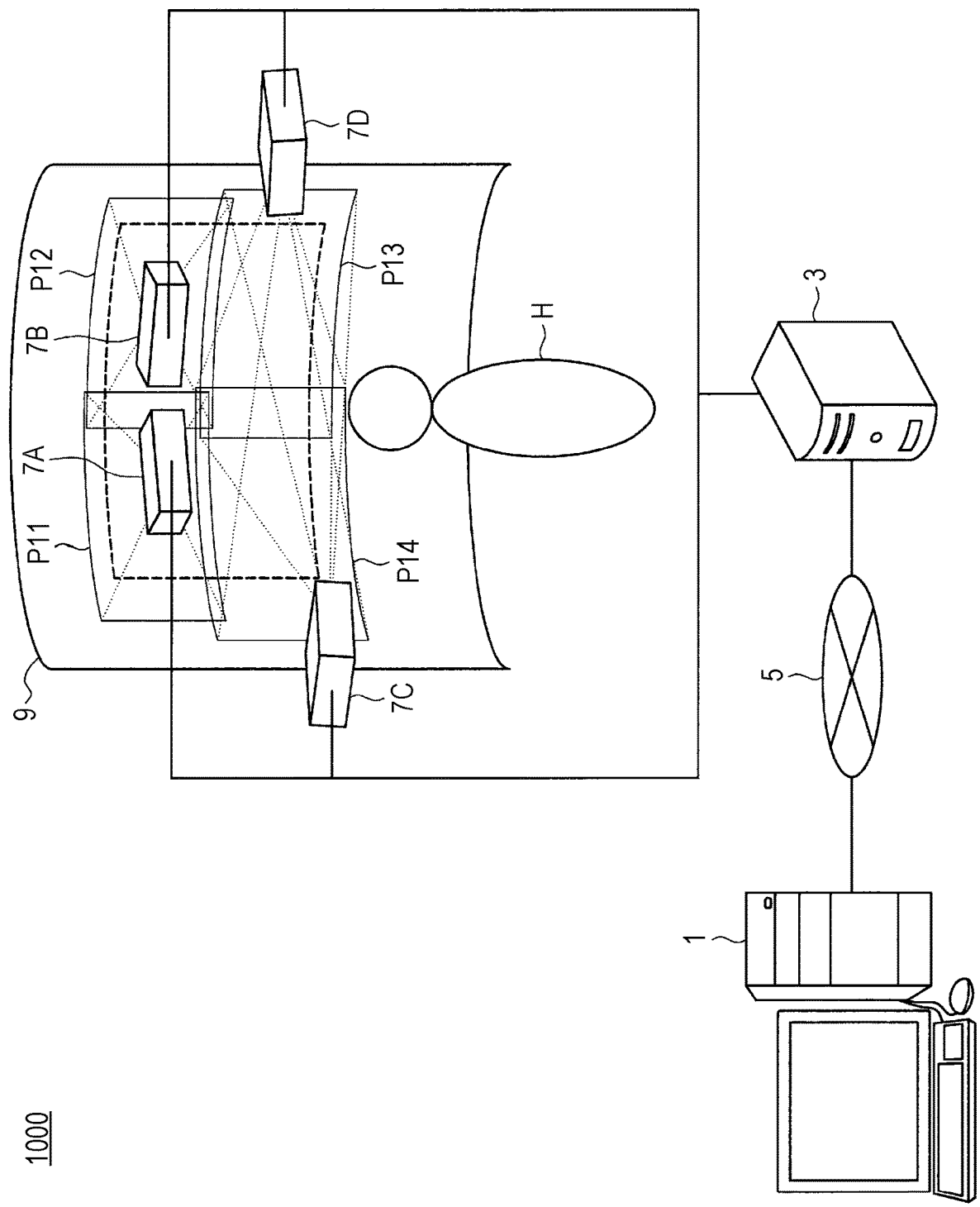
FIG. 1 is an explanatory view for explaining a schematic configuration of a projection system 1000 according to a first embodiment of the present, disclosure.

Preferred embodiments of the present disclosure will be described in detail below with reference to the accompanying drawings. Note that, in this description and the drawings, configuration elements that have substantially the same function and configuration are denoted with the same reference numerals, and repeated explanation is omitted.

Furthermore, in this specification and the drawings, a plurality of configurational elements that has substantially the same function and configuration can be distinguished from each other using different alphabets after the same reference sign. However, in a case where there is no need in particular to distinguish a plurality of configuration elements that has substantially the same function and configuration, the same symbol alone is attached.

Note that the description is given in the order below.
<<1. First Embodiment>>
<1-1. Overview>
<1-<2. Configuration>
<1-3. Operation>
<1-4. Effect>
<<2. Second embodiment>>
<2-1. Overview>
<2-2. Configuration>
<2-3. Operation>
<2-4. Effect>
<<3. Hardware configuration>>
<<4. Conclusion>>

1. First Embodiment

<1-1. Overview>

First, an overview of a projection system according to the first embodiment of the present disclosure is described with reference to FIG. 1. FIG. 1 is an explanatory view for explaining a schematic configuration of a projection system 1000 according to the first embodiment of the present disclosure. As illustrated in FIG. 1, the projection system 1000 according to the present embodiment includes an information processing apparatus 1, a projection control apparatus 3, a communication network 5, projectors 7A to 7D, and a screen 9. Furthermore, a viewer/listener H illustrated in FIG. 1 views projection images P11 to P14 projected on the screen 9 by the projectors 7A to 7D. Note that, in the present specfication, an image is used as an expression including a still image as well as a moving image. Furthermore, a projection image means an image in a state of being projected on the screen 9.

The information processing apparatus 1 outputs (transmits) projector arrangement information associated with the arrangement of the projectors 7A to 7D to the projection control apparatus 3. A specific configuration of the information processing apparatus 1 will be described later with reference to FIG. 2.

The projection control apparatus 3 is an information processing apparatus that transmits an input image to the projectors 7A to 7D. The projection control apparatus 3 may perform correction processing or the like on the basis of the projector arrangement information received from the information processing apparatus 1 and generate an input image transmitted to the projectors 7A to 7D. For example, the projection control apparatus 3 may generate an input image that is obtained when projection images P11 to P14 projected by the projectors 7A to 7D are naturally linked on the screen 9 and that is viewed as a single image by the viewer/listener H, and transmit the input image to the projectors 7A to 7D.

The communication network 5 is a wired or wireless transmission path for information transmitted from an apparatus connected to the communication network 5, or a system. For example, the communication network 5 may include a public network, e.g., the Internet, a telephone network, or a satellite communication network, or various local area networks (LAN) including Ethernet (registered trademark), wide area networks (WAN), or the like. Furthermore, the communication network 5 may include a dedicated network, e.g., an internet protocol-virtual private network (IP-VPN).

The projectors 7A to 7D project the projection images P11 to P14 onto the screen 9 (projection destination), respectively, on the basis of the input image received from the projection control apparatus 3. The projectors 7A to 7D may be arranged according to the projector arrangement information. Note that FIG. 1 illustrates an example in which the projection system 1000 includes the four projectors 7A to 7D, but the number of projectors included in the projection system 1000 is not limited to the above example. Hereinafter, in a case where the number of projectors is not limited, it can be called the projector 7.

The screen 9 is a projection destination (projection surface) for projection by the projector 7. FIG. 1 illustrates an example in which the screen 9 is a curved screen, but the shape of the screen 9 is not limited to the above example, and the screen 9 may be a flat screen or a dome-shaped screen.

In such a projection system 1000, it is important to appropriately arrange the projector 7. For example, in a case where the projector 7 is not appropriately arranged, there is a possibility that the positions of the projection images P11 to P14 projected on the screen 9 become positions that are difficult to see for the viewer/listener H. Furthermore, depending on the position of the projector 7, the projection control apparatus 3 cannot generate an appropriate input image, and there is a possibility that the projection images P11 to P14 are not naturally linked on the screen 9.

Conventionally, for appropriate arrangement of a projector, a user (designer) has manually designed arrangement of the projector on the basis of past experience. However, it was difficult for a user who has less experience of projector arrangement design to appropriately design projector arrangement. Furthermore, even for a user who has experience of projector arrangement design, a burden regarding design operation is large, and particularly in a case where the number of projectors is large or in a case where a projection condition related to projection is complex, there was a possibility that at was difficult to appropriately design projector arrangement.

Thus, in view of the above circumstances, the first embodiment of the present disclosure has been created. The information processing apparatus 1 according to the present embodiment can alleviate the burden on the user such that the projector arrangement is automatically designed on the basis of the projection condition related to projection by the projector 7 and the projector arrangement information is output. A configuration of the information processing apparatus 1 for providing such an effect is described in detail below.

<1-2. Configuration>

Figure 2:
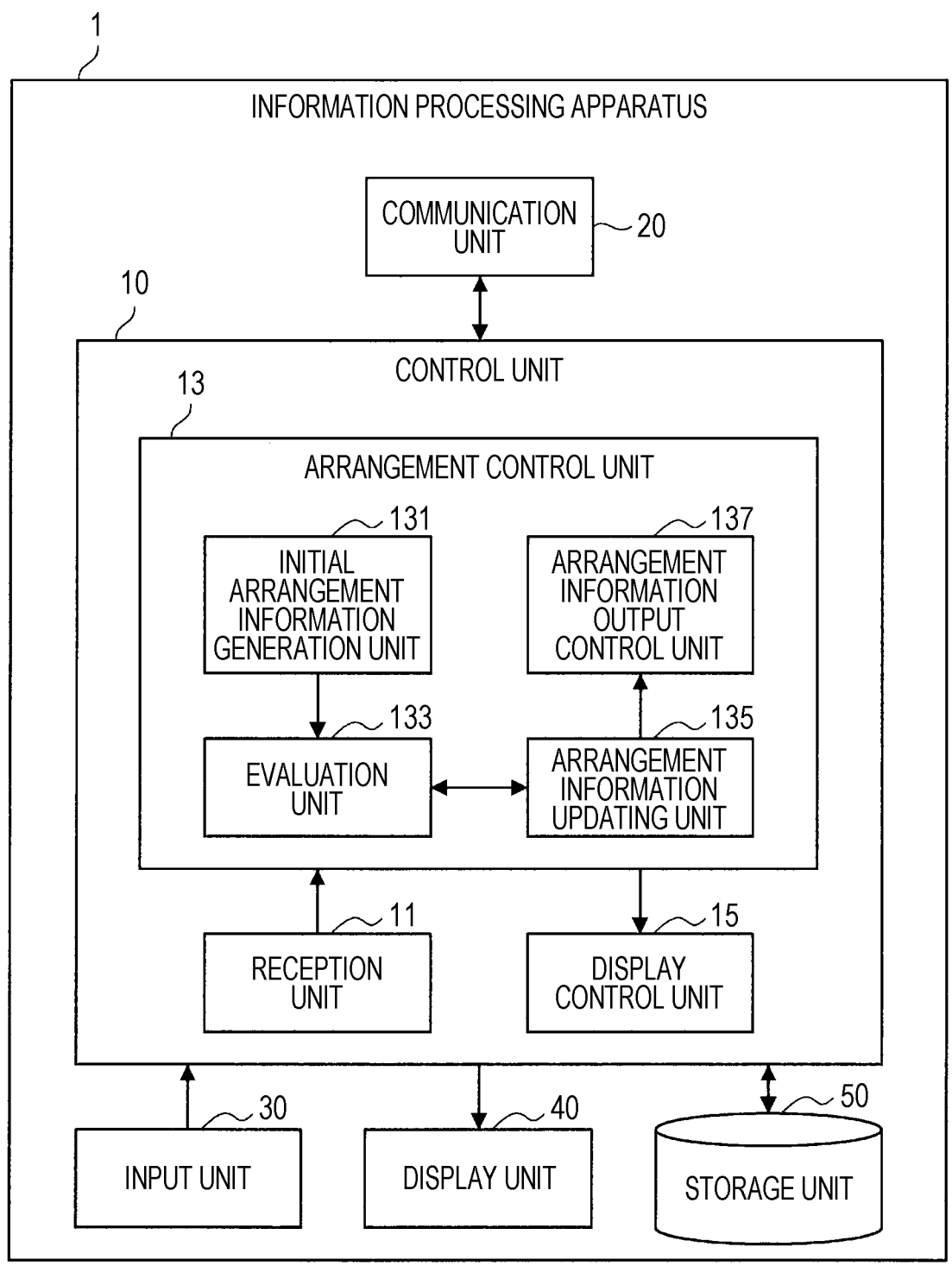
FIG. 2 is a block diagram illustrating a configuration example of an information processing apparatus 1 according to the embodiment.

FIG. 2 is a block diagram illustrating a configuration example of the information processing apparatus 1 according to the embodiment. The information processing apparatus 1 according to the present embodiment includes, as illustrated in FIG. 2, a control unit 10, a communication unit 20, an input unit 30, a display unit 40, and a storage unit 50.

The control unit 10 controls each configuration of the information processing apparatus 1. Furthermore, the control unit 10, as illustrated in FIG. 2, also functions as a reception unit 11, an arrangement control unit 13, and a display control unit 15.

The reception unit 11 receives the user's input via the input unit 30, which will be described later. The reception unit 11 according to the present embodiment receives the projection condition related to projection by the projector 7 and outputs the projection condition to the arrangement control unit 13.

The projection condition received by the reception unit 11 may include a plurality of projection condition parameters. The projection condition may include projection condition parameters, for example, screen shape information, desired projection range information, projector specification information, usable projector number information, projector arrangeable range information, desired projection resolution information, desired projection luminance information, and viewing position information.

The screen shape information is information indicating the shape of the screen, which is a projection destination (projection surface), e.g., the screen 9 illustrated in FIG. 1.

The desired projection range information is information indicating a projection range (desired projection range) desired by the user. For example, a part or whole of the screen 9 can be selected as the desired projection range. Note that, in the present embodiment, the desired projection range is a projection range that is desired, by the user, to be covered (projected) at minimum by the projector 7. Therefore, even in a case where the projector 7 performs projection to the outside of the desired projection range while covering the desired projection range, the user's wish is considered to be satisfied.

The projector specification information is information associated with the specification of the projector 7. The projector specification information may include information, for example, the size, the brightness, the number of projection pixels, the zoomable range, and the shiftable range of the projector 7.

The usable projector number information is information associated with the number of usable projectors. The usable projector number information may be, for example, information of the number of projectors 7 of the projection system 1000. Furthermore, the usable projector number information may be information of an upper limit value, a lower limit value, or a combination thereof of the number of usable projectors.

The projector arrangeable range information is information indicating a range in which the projector 7 can be arranged.

The desired projection resolution information is information indicating a lower value desired by the user with regard to the resolution (pixel density) of the projection image projected on the screen 9 in the aforementioned desired projection range. That is, it is assumed that the user's wish is satisfied when the minimum value of the resolution of the projection image on the screen 9 in the desired projection range is equal to or more than the lower limit value. Note that the desired projection resolution information may be specified, for example, by the format of the number of pixels of the projection image per unit area on the screen 9 or may be specified by the format of the number of pixels of the projection image per unit angle when the screen 9 is viewed from the viewing position.

The desired projection luminance information is information indicating a lower limit value desired by the user with regard to the luminance of the projection image projected on the screen 9 in the aforementioned desired projection range. That is, it is assumed that the user's wish is satisfied when the minimum value of the luminance of the projection image on the screen 9 in the desired projection range is equal to or more than the lower limit value.

The viewing position information is information indicating the position of an assumed viewer/listener. The viewing position information may be information indicating the position of a point or may be information indicating a range in which the viewer/listener can be present.

The reception unit 11 receives the aforementioned projection condition parameter on the basis of the user's input via the input unit 30. For example, the aforementioned projection condition parameter may be received through direct input by the user, or the projection condition parameter may be received by being selected by the user from preliminarily prepared options related to the projection condition parameter. Rote that the options related to the projection condition parameter may be stored, for example, in the storage unit 50 or may be acquired from a different apparatus, which is not illustrated, via the communication unit 20.

Furthermore, it is sufficient if the reception unit 11 receives a projection condition including at least some projection condition parameter of the aforementioned projection condition parameters. That is, not all the aforementioned projection condition parameters may be specified.

Furthermore, the reception unit 11 receives a change with regard to the aforementioned projection condition parameter or an additional projection condition parameter on the basis of the user's input via the input unit 30. For example, the reception unit 11, as will be described later, may receive a change with regard to the projection condition parameter or an additional projection condition parameter when the projection state obtained through a simulation on the basis of the projector arrangement information is displayed on the display unit 40.

The arrangement control unit 13 automatically designs arrangement of the projector 7 on the basis of the projection condition the reception unit 11 has received, and outputs the projector arrangement information associated with the designed arrangement of the projector 7. Note that in the present specification, "outputting the projector arrangement information" can include that the projector arrangement information is output to the display control unit 15, the projector arrangement information is output to the storage unit 50, and the projector arrangement information is output to a different apparatus via the communication unit 20.

The arrangement control unit 13 according to the present embodiment, as illustrated in FIG. 2, functions as an initial arrangement information generation unit 131, an evaluation unit 133, an arrangement information updating unit 135, and an arrangement information output control unit 137.

The initial arrangement information generation unit 131 generates the projector arrangement information on the basis of the projection condition. The projector arrangement information generated by the initial arrangement information generation unit 131 may include information, e.g., the number of projectors 7, the position, the direction, the zoom rate, and the shift amount of each projector 7. Note that the number of projectors 7, the position, the direction, the zoom rate, and the shift amount of each projector 7 can be collectively called the projector arrangement parameter below.

Note that the projector arrangement information generated by the arrangement information generation unit 131 is so-called tentative projector arrangement information and may not satisfy all the aforementioned projection conditions.

The initial arrangement information generation unit 131 may arrange the projector such that a condition regarding some projection condition parameter of the projection conditions (e.g., screen shape information, usable projector number information, projector specification information, and projector arrangeable range information) is satisfied.

For example, the initial arrangement information generation unit 131 may generate the projector arrangement information as to the projector 7 randomly arranged within the projector arrangeable range. Alternatively, the initial arrangement information generation unit 131 may generate the projector arrangement information as to the projector 7 arranged in a position according to a predetermined rule (e.g., the position directly opposite to the screen 9). The projector arrangement information generated by the initial arrangement information generation unit 131 is provided to the evaluation unit 133.

The evaluation unit 133 evaluates the projector arrangement information and specifies an evaluation value regarding the projector arrangement information on the basis of the projection condition. The evaluation unit 133, in a case where all the projection conditions are satisfied, when the projector 7 is arranged according to the projector arrangement information, may specify an evaluation value regarding the projector arrangement information such that the evaluation value regarding the projector arrangement information becomes the predetermined value. For example, the evaluation unit 133 may specify an evaluation value regarding the projector arrangement information such that the closer to a state in which the projection condition is satisfied, the larger the evaluation value regarding the projector arrangement information, and in the above case the aforementioned predetermined value becomes a possible maximum value of the evaluation value.

The evaluation unit 133 may specify an evaluation value regarding the projector arrangement information further on the basis of some projection condition parameter of the projection conditions and the projection state information obtained through a simulation using the projector arrangement information. The above simulation may use, for example, among the projection conditions, the screen shape information, the projector specification information, and the viewing position information. Furthermore, the above simulation may be performed by the evaluation unit 133 or may be performed by a different function block. The projection state information is information indicating a simulation result obtained by a simulation with regard to a state in which the projector 7 performs projection onto the screen 9 in a case where the projector 7 is arranged according to the projector arrangement information.

The projection state information may include, for example, information indicating a simulation result with regard to the resolution of a projection image projected by the projector 7 onto the screen 9, and the evaluation unit 133 may specify an evaluation value $E_{Pr}$ regarding the resolution of the projection image on the basis of the simulation result. The evaluation unit 133 may specify the evaluation value $E_{Pr}$ by evaluating the simulation result on the basis of the desired projection range information and the desired projection resolution information included in the projection conditions.

For example, the evaluation unit 133 may specify a minimum resolution of the projection image in the desired projection range on the basis of the simulation result and may specify evaluation value $E_{Pr}$ such that the higher the minimum resolution the larger than evaluation value $E_{Pr}$. Note that, in a case where a region not covered (projected) by the projector 7 is present in the desired projection range, the minimum resolution is zero. Furthermore, the evaluation unit 133 may specify the evaluation value $E_{Pr}$ such that the evaluation value $E_{Pr}$ becomes the maximum value $E_{Pr}'$ in a case where the specified minimum resolution is equal to or more than the desired imaging resolution.

When the evaluation value $F_{Pr}$ is specified as described above, in a case where the evaluation value $E_{Pr}$ is the maximum value $E_{Pr}'$, among the projection conditions, the conditions regarding the desired projection range information and the desired projection resolution information are satisfied.

The projection state information may include, for example, information indicating a simulation result with regard to the luminance of a projection image projected by the projector 7 onto the screen 9, and the evaluation unit 133 may specify an evaluation value $E_{Pb}$ regarding the luminance of the projection image on the basis of the simulation result. The evaluation unit 133 may evaluate the simulation result on the basis of the desired projection range information and the desired projection luminance information included in the projection conditions, and specify the evaluation value $E_{Pb}$.

For example, the evaluation unit 133 may specify a minimum luminance of the projection image in the desired projection range on the basis of the simulation result and may specify the evaluation value $E_{Pb}$ such that the higher the minimum luminance the larger the evaluation value $E_{Pb}$. Note that, in a case where a region not covered (projected) by the projector 7 is present in the desired projection range, the minimum luminance is zero. Furthermore, the evaluation unit 133 may specify the evaluation value $E_{Pb}$ such that the evaluation value $E_{Pb}$ becomes the maximum value $E_{Pb}'$ in a case where the specified minimum luminance is equal to or more than the desired projection luminance.

When the evaluation value $E_{Pb}$ is specified as described above, in a case where the evaluation value $E_{Pb}$ is the maximum value $E_{Pb}'$, among the projection conditions, the conditions regarding the desired projection range information and the desired projection luminance information are satisfied.

The projection state information may include, for example, information indicating a simulation result with regard to crossing between a beam emitted from the projector 7 and a subject other than the screen 9 (projection surface), and the evaluation unit 133 may specify an evaluation value $E_{Pc}$ regarding the crossing on the basis of the simulation result. Note that the subject other than the screen 9 that can cross the beam emitted from the projector 7 can include, for example, a projector 7 other than the projector 7 that emits the beam and a viewer/listener present in the viewing position. A simulation with regard to the crossing between the beam emitted from the projector 7 and the subjects can be performed on the basis of the projector specification information and the viewing position information included in the projection conditions.

For example, the evaluation unit 133 may specify the evaluation value $E_{Pc}$ on the basis of the simulation result such that the larger the crossing region between the beam emitted from the projector 7 and the subject other than the screen 9 (projection surface), the smaller the evaluation value $E_{Pc}$. Furthermore, the evaluation unit 133 may specify the evaluation value $E_{Pc}$ such that the evaluation value $E_{Pc}$ becomes the maximum value $E_{Pc}'$ in a case where the crossing region is not present.

When the evaluation value $E_{Pc}$ is specified—as described above, in a case where the evaluation value $E_{Pc}$ is the maximum value $E_{Pc}'$, the condition regarding the viewing position information among the projection conditions is satisfied.

The evaluation unit 133 may specify the evaluation value $E_P$ regarding the projector arrangement information by combining the aforementioned evaluation value $E_{Pr}$, evaluation value $E_{Pb}$, and evaluation value $E_{Pc}$. For example, the evaluation unit 133 may specify the evaluation value $E_P$ using Formula (1) below.

$$E_P = w_{Pr}E_{Pr} + w_{Pb}E_{Pb} + w_{Pc}E_{Pc} \quad (1)$$

Note that, in Formula (1), $w_{Pr}$, $w_{Pb}$, and $w_{Pc}$ are predetermined weighting factors for the evaluation value $E_{Pr}$, the evaluation value $E_{Pb}$, and the evaluation value $E_{Pc}$, respectively, and are used for balancing influences of the evaluation values.

Furthermore, in a case where the projector arrangement information satisfies all the projection conditions, the evaluation value $E_P$ regarding the projector arrangement information matches a predetermined maximum value $E_P'$ expressed by Formula (2) below.

$$E_P' = w_{Pr}E_{Pr}' + w_{Pb}E_{Pb}' + w_{Pc}E_{Pc}' \quad (2)$$

The arrangement information updating unit 135 updates the projector arrangement information on the basis of the evaluation value $E_P$ regarding the projector arrangement information. For example, the arrangement information updating unit 135 determines whether or not the evaluation value $E_P$ specified by the evaluation unit 133 matches the predetermined maximum value $E_P'$, and updates the projector arrangement information until the evaluation value $E_P$ matches the predetermined maximum value $E_P'$. Note that the arrangement information updating unit 135 may update the projector arrangement information such that, among the projection conditions, the conditions regarding the screen shape information, the usable projector number information, the projector specification information, and the arrangeable range information are satisfied.

For example, the arrangement information updating unit 135 may change any one of the projector arrangement parameters (the number of projectors 7, the position, the direction, the zoom rate, and the shift amount of each projector 7) included in the projector arrangement information, and generate new projector arrangement information.

Furthermore, the arrangement information updating unit 135 may update the projector arrangement information such that a difference between the evaluation value $E_P$ and the predetermined maximum value $E_P'$ becomes smaller. With the above configuration, the arrangement information updating unit 135 can efficiently update the projector arrangement information.

The arrangement information updating unit 135 may update the projector arrangement information such that a difference between the evaluation value $E_P$ and the maximum value $E_P'$ becomes smaller by performing nonlinear optimization with regard to the evaluation value $E_P'$. For example, a repetition of generation of the projector arrangement parameter and comparison of the evaluation values enables update of the projector arrangement information such that a difference between the evaluation value $E_P$ and the predetermined maximum value $E_P'$ becomes smaller. An example is described below.

First, the arrangement information updating unit 135 selects any one of the projector arrangement parameters included in first projector arrangement information, slightly changes the selected parameter in a certain direction (e.g., an increment direction or a decrement direction), and generates second projector arrangement information. Then, the arrangement information updating unit 135 makes a comparison between first evaluation value $E_P$ regarding the first projector arrangement information and second evaluation value $E_P$ regarding the second projector arrangement information specified by the evaluation unit 133.

In a case where the second evaluation value $E_P$ is larger than the first evaluation value $E_P$, the arrangement information updating unit 135 slightly changes the previously selected parameter of the projector arrangement parameters included in the second projector arrangement information in the previously changed direction and generates third projector arrangement information.

Meanwhile, in a case where the second evaluation value $E_P$ is smaller than the first evaluation value $E_P$, the arrangement information updating unit 135 selects a parameter different from the previously selected parameter among the projector arrangement parameters included in the second projector arrangement information, slightly changes the selected parameter in a certain direction, and generates the third projector arrangement information. Note that, in the above case, the arrangement information updating unit 135 may slightly change the previously selected parameter of the projector arrangement parameters included in the second projector arrangement information in a direction different from the previously changed direction, and generate the third projector arrangement information.

Then, the arrangement information updating unit 135 makes a comparison between the second evaluation value $E_P$ regarding the second projector arrangement information and the third evaluation value $E_P$ regarding the third projector arrangement information specified by the evaluation unit 133. Then, depending on results of the comparison, the projector arrangement parameter included in the third projector arrangement information is changed and new projector arrangement information is generated. As described above, a repetition of generation of a new projector arrangement parameter and comparison of evaluation values enables the arrangement information updating unit 135 to update the projector arrangement information such that a difference between the evaluation value $E_P$ and the maximum value $E_P'$ becomes smaller.

In the above example, a description is given of an example in which the arrangement information updating unit 135 sequentially updates the projector arrangement information, but the arrangement information updating unit 135 can simultaneously prepare a plurality of pieces of projector arrangement information and can perform optimization using a genetic algorithm. With the genetic algorithm, a genetic manipulation, e.g., selection, crossover, or mutation, is performed.

The selection is a genetic manipulation that models natural selection of organisms. The selection in the present embodiment may be a manipulation that increases or deletes the projector arrangement information on the basis of the evaluation value. Furthermore, the crossover is a genetic manipulation that models partial exchange of chromosomes in mating of organisms. The crossover in the present embodiment may be a manipulation in which the projector arrangement parameter is assumed to resemble a gene and some projector arrangement parameters included in the plurality of pieces of projector arrangement information are replaced. Furthermore, the mutation is a genetic manipulation that models genetic mutation seen in organisms. The mutation in the present embodiment may be a manipulation in which the projector arrangement parameter is assumed to resemble a gene and some projector arrangement parameters included in the projector arrangement information are changed.

The arrangement information updating unit 135 may update the projector arrangement information using the aforementioned genetic manipulation with the above configuration, the arrangement information updating unit 135 is capable of obtaining the projector arrangement information with which the evaluation value $E_P$ matches the predetermined maximum value $E_P{'}$ without falling into a local optimal solution.

The arrangement information output control unit 137 controls output of the projector arrangement information. For example, the arrangement information output control unit 137, in a case where the arrangement information updating unit 135 determines that the evaluation value $E_P$ matches the predetermined maximum value $E_P{'}$, may output the projector arrangement information regarding the evaluation value $E_P$. With the above configuration, the projector arrangement information that satisfies all the projection conditions is output.

As described above, the arrangement information output control unit 137 may output the projector arrangement information to the display control unit 15. Furthermore, the arrangement information output control unit 137 may output the projector arrangement information to a different apparatus (e.g., the projection control apparatus 3 illustrated in FIG. 1) via the communication unit 20. Furthermore, the arrangement information output control unit 137 may output the projector arrangement information to the storage unit 50 (i.e., the projector arrangement information may be stored in the storage unit 50).

Note that the arrangement information output control unit 137, in a case where the evaluation value $E_P$ matches the predetermined maximum value $E_P{'}$ and the user is satisfied with the projector arrangement information regarding the evaluation value $E_P$, may output the projector arrangement information to a different apparatus via the communication unit 20. Furthermore, similarly, the arrangement information output control unit 137, in a case where the evaluation value $E_P$ matches the predetermined maximum value $E_P{'}$ and the user is satisfied with the projector arrangement information regarding the evaluation value $E_P$, may output the projector arrangement information to the storage unit 50. Note that whether or not the user is satisfied with the projector arrangement information regarding the evaluation value $E_P$ may be determined on the basis of the information input by the user, who has checked the display (to be described later) of the display unit 40 on the basis of the projector arrangement information, via the input unit 30.

With the above configuration, the projector arrangement information that satisfies all the projection conditions and satisfies the user is output to a different apparatus or the storage unit 50 as the finally obtained (designed) projector arrangement information.

The display control unit 15 controls the display unit 40 and causes the display unit 40 to display various screens. For example, the display control unit 15 may cause a projection state, which is obtained through a simulation based on the projector arrangement information output from the arrangement control unit 13, to be displayed. For example, the display control unit 15 may cause a visualization screen, which visualized a projection state, to be displayed. Note that the above simulation and visualization may be performed by the display control unit 15 or may be performed by a different function block.

Figure 3:
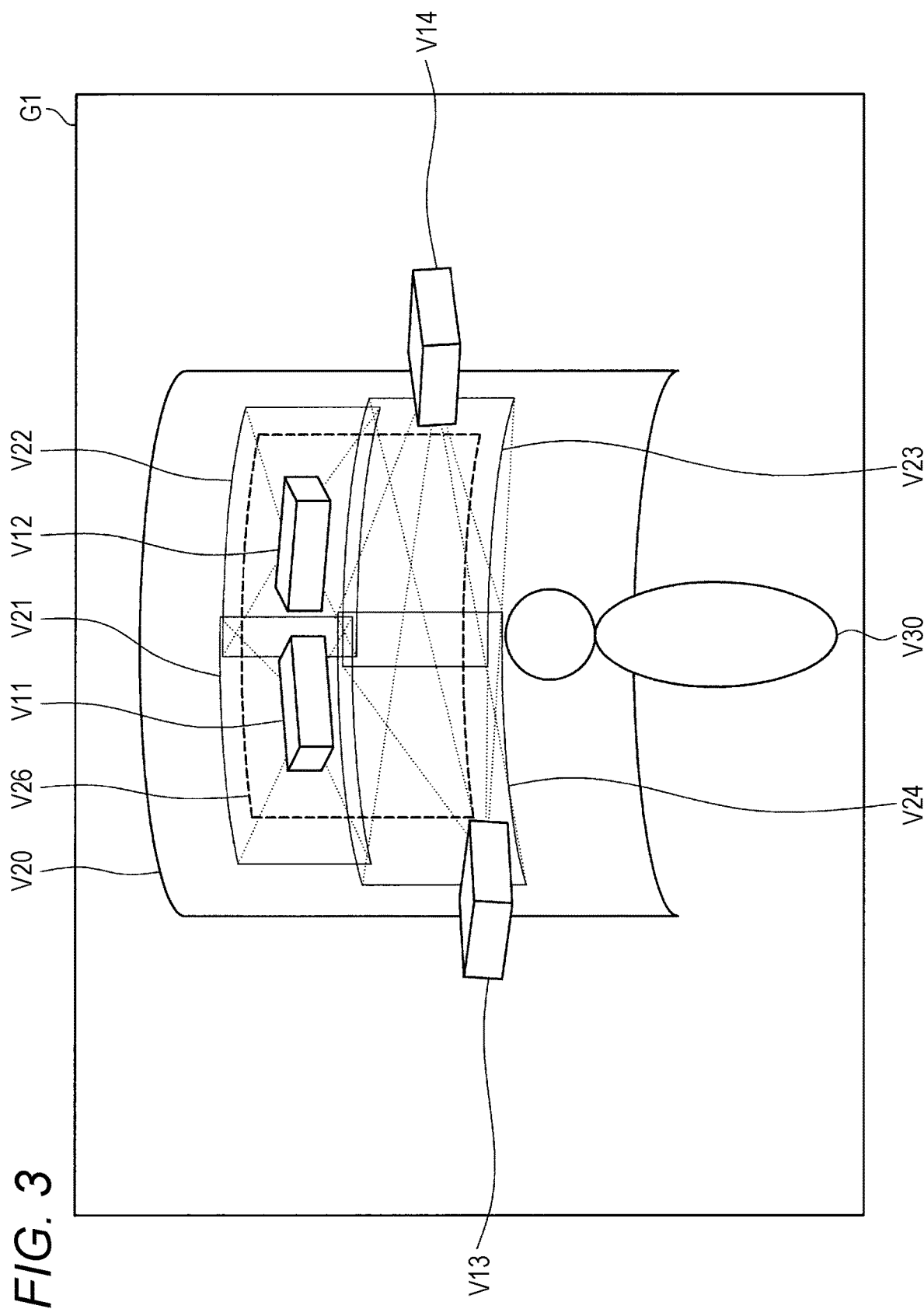
FIG. 3 is an explanatory view illustrating an example of a visualization screen including a projection state displayed by a display control unit 15 according to the embodiment on a display unit 40.

FIG. 3 is an explanatory view illustrating an example of a visualization screen including a projection state displayed by the display control unit 15 on the display unit 40. As illustrated in FIG. 3, visualization screen G1 includes projection images V21 to V24 (they are respectively the projection images P11 to P14 illustrated in FIG. 1) onto screen V20 (corresponding to the screen 9 illustrated in FIG. 1) by projectors V11 to V14 (they correspond respectively to the projectors 7A to 7D illustrated in FIG. 1). Furthermore, the visualization screen G1 also includes desired projection range V26. With the above configuration, the user can check whether the desired projection range is fully covered (projected).

Note that, on the visualization screen G1 caused to be displayed by the display control unit 15, the luminance of the projection images V21 to V24 on the screen V20 may be that corresponding to the luminance simulated on the basis of the projection conditions or the projector arrangement information. With the above configuration, the user can check the luminance of the projection image.

Furthermore, as illustrated in FIG. 3, the visualization screen G1 caused to be displayed by the display control unit 15 includes viewer/listener V30 (corresponding to the viewer/listener H illustrated in FIG. 1). With the above configuration, the user can understand the movable range of the viewer/listener.

Note that the screen caused to be displayed by the display control unit 15 is not limited to the example illustrated in FIG. 3, but the display control unit 15 may cause information associated with the projection state (e.g., information as to the minimum resolution, the minimum luminance, presence or absence of the crossing region described above) to be displayed by text.

Referring back to FIG. 2, a description is continued. The communication unit 20 is a communication interface that is controlled by the control unit 10 and mediates communication with respect to a different apparatus. The communication unit 20 supports any wireless communication protocol or wired communication protocol, and establishes communication connection with respect to a different apparatus via the communication network 5 as illustrated, for example, in FIG. 1. For example, the communication unit 20 is controlled by the arrangement information output control unit 137 and transmits (outputs) the projector arrangement information to the projection control apparatus 3 illustrated in FIG. 1.

The input unit 30 provides the user s input to the control unit 10. For example, the user may manipulate the input unit 30 to perform input related to the projection conditions or input for selection as to whether or not the user is satisfied with the projector arrangement information.

The display unit 40 is a display that is controlled by the aforementioned display control unit 15 and displays various screens. For example, the display unit 40 may display the aforementioned visualization screen.

The storage unit 50 stores a program or a parameter for each configuration of the information processing apparatus 1 to function. Furthermore, the storage unit 50 may store the projector arrangement information output by the arrangement control unit 13.

Heretofore, a configuration example of the information processing apparatus 1 according to the present embodiment has been described. Note that the configuration of the information processing apparatus 1 illustrated in FIG. 2 is a mere example and the present embodiment is not limited thereto. For example, the functions of the control unit 10 according to the present embodiment may be included in a different information processing apparatus connected via the communication unit 20. For example, in a case where the reception unit 11 is included in a different information processing apparatus, projection conditions received by the different information processing apparatus may be provided to the information processing apparatus 1 via the communication unit 20.

<1-3. Operation>

Next, an operation example of the information processing apparatus 1 according to the present embodiment is described. First, flow of an overall operation of the information processing apparatus 1 is described with reference to FIG. 4, and then flow of automatic projector arrangement design processing by the arrangement control unit 13 is described in detail with reference to FIG. 5.

(Overall Operation)

Figure 4:
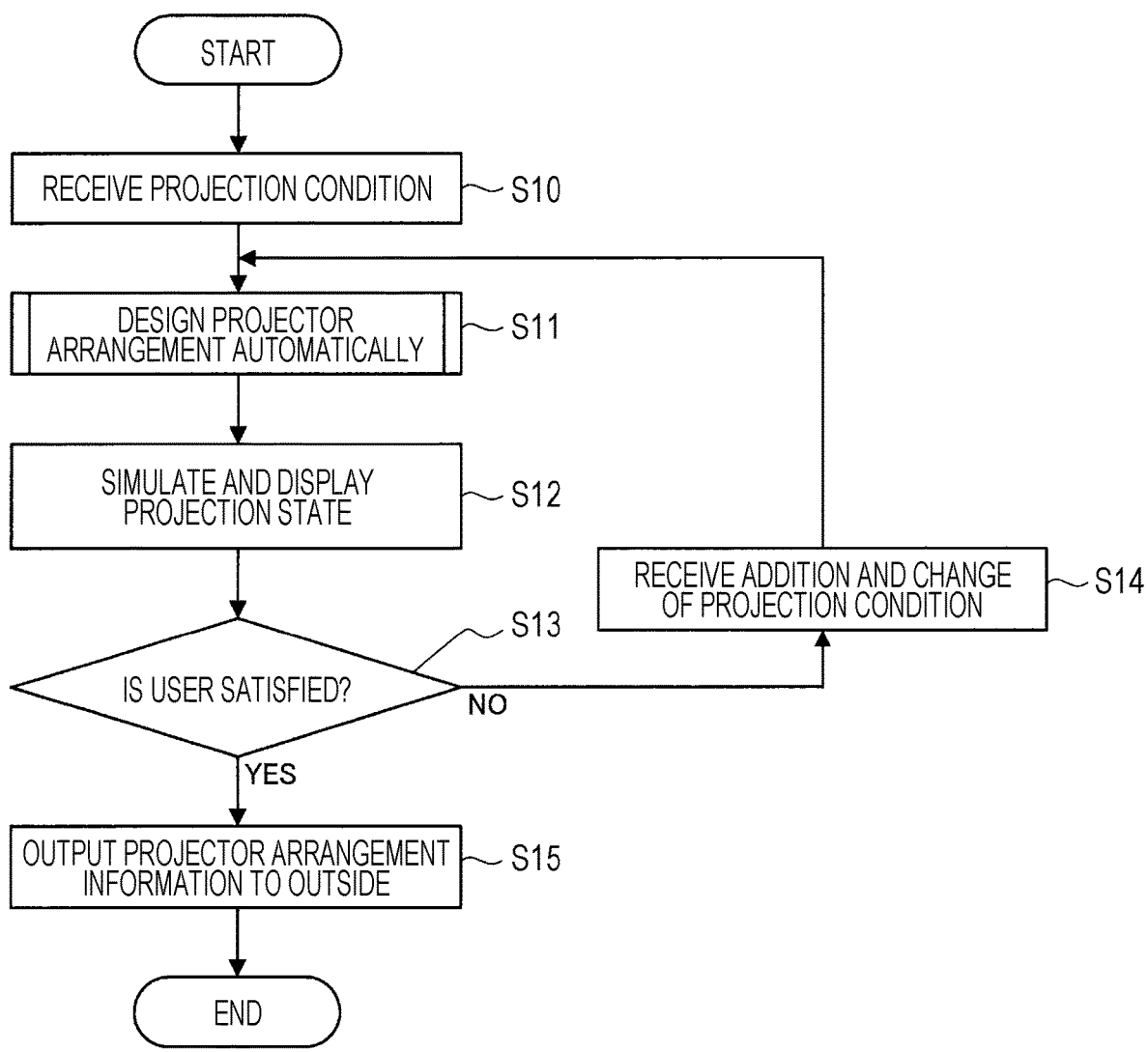
FIG. 4 is a flowchart illustrating an overall operation of the information processing apparatus 1 according to the embodiment.

FIG. 1 is a flowchart illustrating an overall operation of the information processing apparatus 1 according to the present embodiment. As illustrated in FIG. 4, first, the reception unit 11 receives the projection condition on the basis of the user's input via the input unit 30 (S10).

Next, on the basis of the projection condition received in step 310, the arrangement control unit 13 automatically designs projector arrangement (S11). Note that the processing of step S11 (automatic projector arrangement design processing) will be described later in detail with reference to FIG. 5.

Next, a screen including a projection state obtained through a simulation based on the projector arrangement information output from the arrangement control unit 13 as a result of the automatic design performed in step S11 is caused to be displayed on the display unit 40 by the display control unit 15 (S12). The user who has checked the screen including the projection state displayed on the display unit 40 in step S12 selects whether or not the user is satisfied by manipulating the input unit 30 (S13).

In a case where the user is not satisfied (NO in S13), the reception unit 11 receives a change with regard to the projection condition parameter or an additional projection condition parameter (S14). In step S14, it is expected that change or addition is performed with regard to the projection condition parameter corresponding to a portion that is determined to be unsatisfactory by the user. For example, in a case where the resolution on the screen needs to be increased, the desired projection resolution information is changed to increase the desired imaging resolution. Thus, in a case where the automatic projector arrangement design is performed again, it is expected that the projector arrangement, is improved such that, the number of projectors is increased to narrow the angle of view of the projectors (change in zoom rate) or the projectors are brought closer. Furthermore, in a case where the luminance on the screen needs to be increased, the desired projection luminance information is changed to increase the desired projection luminance. Thus, in a case where the automatic projector arrangement design is performed again, it is expected that the projector arrangement, is improved such that the number of projectors is increased to overlay the projections of the plurality of projectors or to narrow the angle of view of the projectors (change in zoom rate), or the projectors are brought closer. Note that the processing after step S14 returns to step S11, and the automatic projector arrangement design is performed again on the basis of a changed or added projection condition parameter.

Meanwhile, in a case where the user is satisfied (YES in S13), the arrangement information output control unit 137 controls the communication unit 20 and outputs the projector arrangement information to a different apparatus (outside) (S15). The projector arrangement information output to the outside may be used, for example, when the projector 7 illustrated in FIG. 1 is arranged (set up) in practice. Furthermore, the projector arrangement information output to the outside may be used as an attitude estimation initial value when the projection control apparatus 3 illustrated in FIG. 1 performs the correction processing.

(automatic Projector Arrangement Design Processing)

Figure 5:
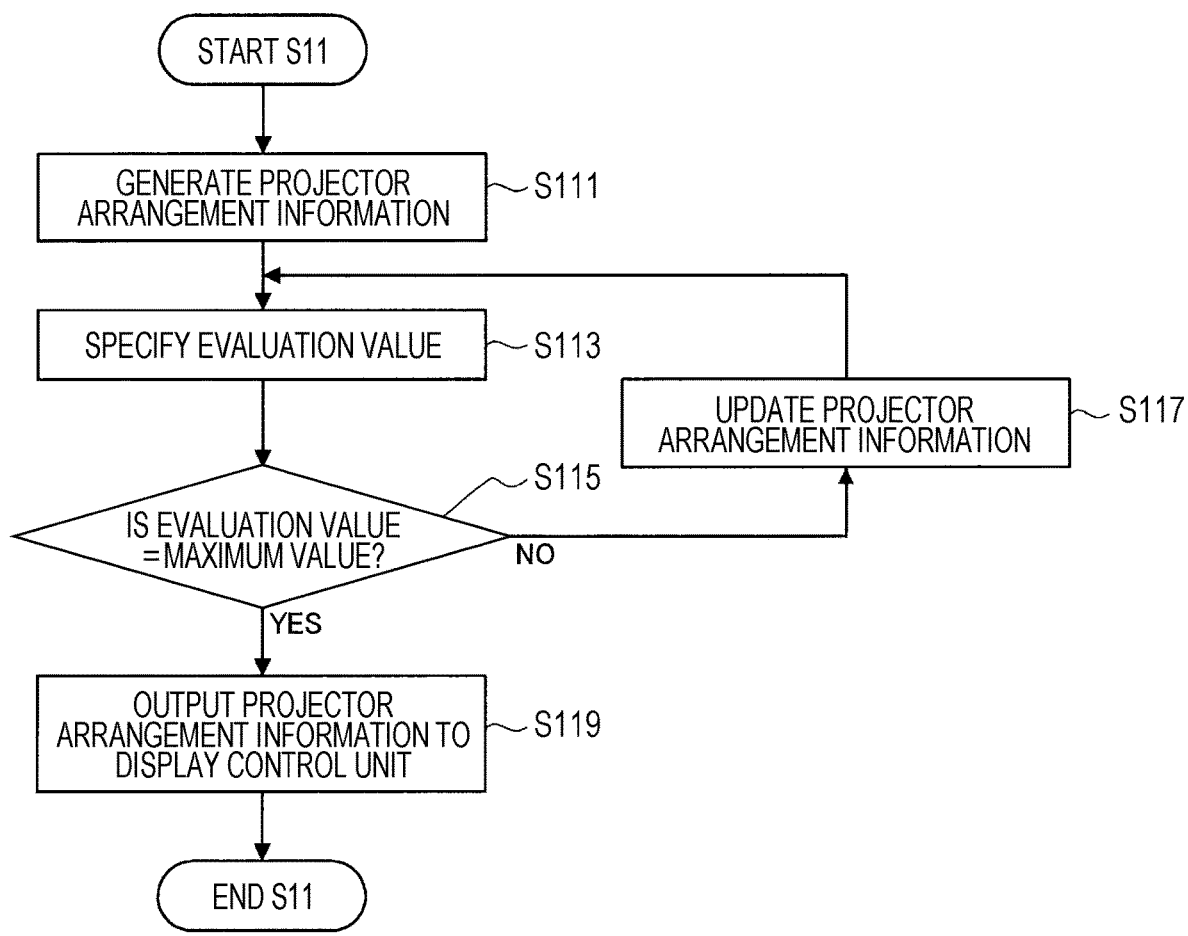
FIG. 5 is a flowchart illustrating flow of automatic projector arrangement design processing by an arrangement control unit 13 according to the embodiment.

Heretofore, the flow of the overall operation of the information processing apparatus 1 according to the present embodiment has been described. Next, the processing of step S11 illustrated in FIG. 4 (automatic projector arrangement design processing) is described in more detail with reference to FIG. 5. FIG. 5 is a flowchart illustrating flow of the automatic projector arrangement design processing by the arrangement control unit 13.

As illustrated in FIG. 5, first, the initial arrangement information generation unit 131 of the arrangement control unit 13 generates the projector arrangement information (S111). Next, the evaluation unit 133 of the arrangement control unit 13 specifies the evaluation value $E_P$ regarding the projector arrangement information (S113).

Next, the arrangement information updating unit 135 of the arrangement control unit 13 determines whether or not the evaluation value $E_P$ specified in step S113 matches the predetermined maximum value $E_P'$ (S115). In a case where the evaluation value $E_P$ does not match the predetermined maximum value $E_P'$ (NO in S115), the arrangement information updating unit 135 updates the projector arrangement information (S117), the processing returns to step S113, and the evaluation value. $E_P$ regarding the updated projector arrangement information is specified. That is, the arrangement information updating unit 135 repeats updating the projector arrangement information until the evaluation value $E_P$ matches the predetermined maximums value $E_P'$.

Meanwhile, in a case where the evaluation value $E_P$ matches the predetermined maximum value $E_P'$ (YES in S115), the arrangement information output control unit 137 of the arrangement control unit 13 outputs the projector arrangement information to the display control unit 15 (S119).

<1-4. Effect>

Heretofore, the first embodiment of the present disclosure has been described. According to the present embodiment, the arrangement of the projector can be automatically designed on the basis of the projection conditions, and a burden on the user is alleviated.

2. Second Embodiment

<2-1. Overview

Figure 6:
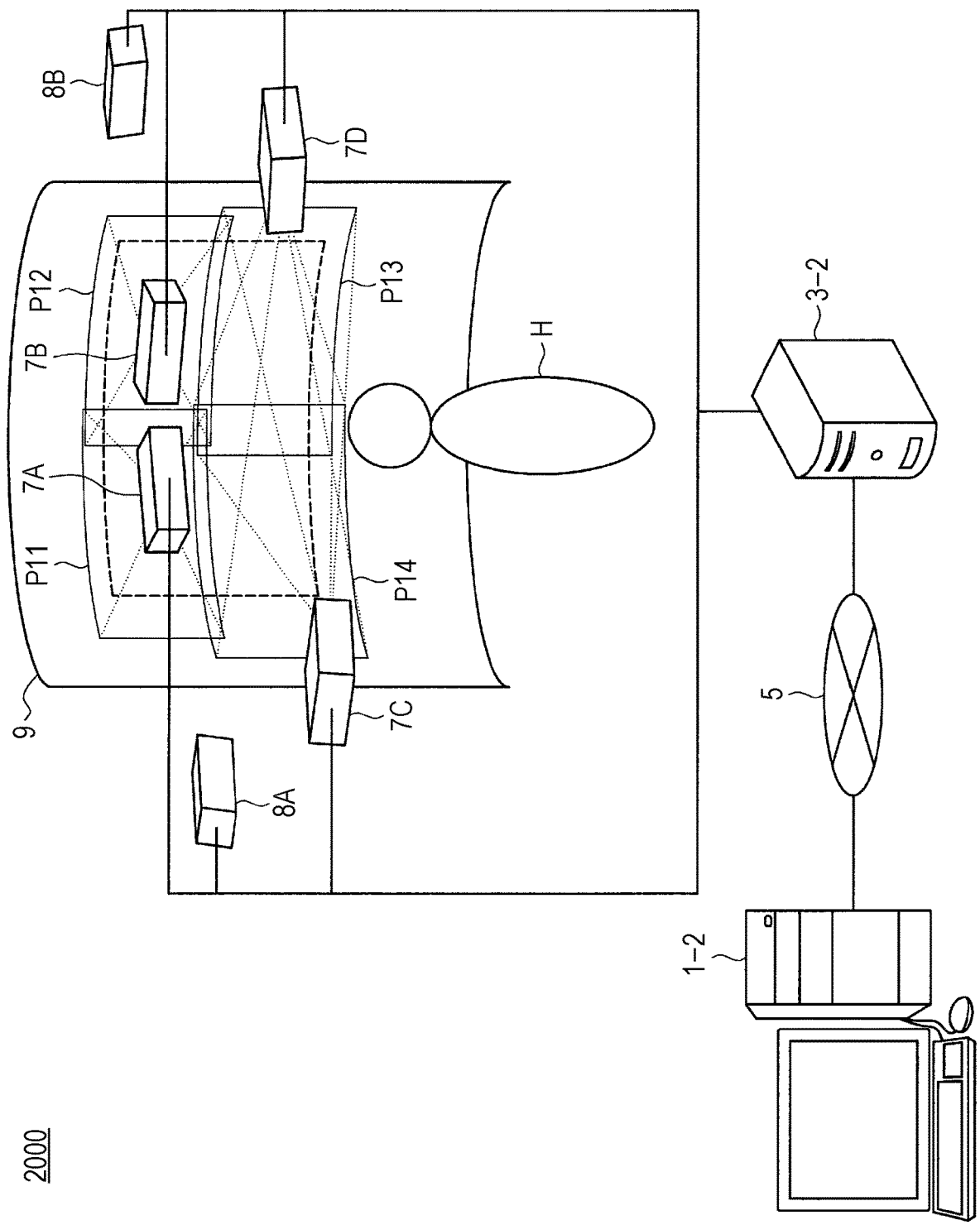
FIG. 6 is an explanatory view for explaining a schematic configuration of a projection system 2000 according to a second embodiment of the present disclosure.

Next, the second embodiment of the present disclosure is described FIG. 6 is an explanatory view for explaining a schematic configuration of a projection system 2000 according to the second embodiment of the present disclosure. As illustrated in FIG. 2, the projection system 2000 according to the present embodiment includes an information processing apparatus 1-2, a projection control apparatus 3-2, a communication network 5, projectors 7A to 7D, cameras 8A and 8B, and a screen 9. The configuration of the projection system 2000 according to the present embodiment is similar to the configuration of the projection system 1000 according to the first embodiment described with reference to FIG. 1 except that the functions of the information processing apparatus 1-2 and the projection control apparatus 3-2 partially differ from the functions of the information processing apparatus 1 and the projection control apparatus 3 and the cameras 8A and 8B are further included. Accordingly, a description of portions similar to those of the first embodiment is properly omitted and portions different from those of the first embodiment are mainly described below.

The information processing apparatus 1-2 according to the present embodiment outputs (transmits) the camera arrangement information (an example of the sensor arrangement information) associated with the arrangement of the cameras 8A and 8B to the projection control apparatus 3-2 in addition to the projector arrangement information associated with the arrangement of the projector 7. A specific configuration of the information processing apparatus 1-2 will be described later with reference to FIG. 7.

Similarly to the projection control apparatus 3 according to the first embodiment, the projection control apparatus 3-2 is an information processing apparatus that transmits an input image, which is generated by performing the correction processing or the like, to the projectors 7A to 7D on the basis of the projector arrangement information received from the information processing apparatus 1-2. The projection control apparatus 3-2 according to the present embodiment may perform the correction processing further on the basis of a captured image obtained by imaging (sensing) the projection images P11 to P14 on the screen 9 by the cameras 8A and 8B. For example, the projection control apparatus 3-2 may perform correction on the basis of corresponding point information using Structured light and generate an input image.

The cameras 8A and 8B are sensors that image (sense) at least some of the projection images P11 to P14 projected on the screen 9 by the projectors 7A to 7D to acquire a captured image. The cameras 8A and 8B may be arranged according to the camera arrangement information. Note that FIG. 6 illustrates an example in which the projection system 2000 includes the two cameras 8A and 8B, but the number of cameras included in the projection system 2000 is not limited to the above example. In the following, in a case where the number of cameras is not limited or distinguished, it can be called the camera 8.

With such projection system 2000, not only appropriate arrangement of the projector 7, but also appropriate arrangement of the camera 8 is important. An a case where the camera 8 is not arranged appropriately, the projection images P11 to P14 projected on the screen 9 cannot be sufficiently sensed, and there is a possibility that the projection control apparatus 3 fails in correction processing.

Furthermore, similarly to the design of the projector arrangement, design of camera arrangement was a burden on the user. Thus, in view of the above circumstances, the second embodiment, of the present disclosure has been created. The information processing apparatus 1-2 according to the present embodiment can automatically design not only the arrangement of the projector, but also the arrangement of the camera, output the projector arrangement information and the camera arrangement information, and alleviate the burden on the user. A configuration of the information processing apparatus 1-2 for providing such an effect is described in detail below.

<2-2. Configuration>

Figure 7:
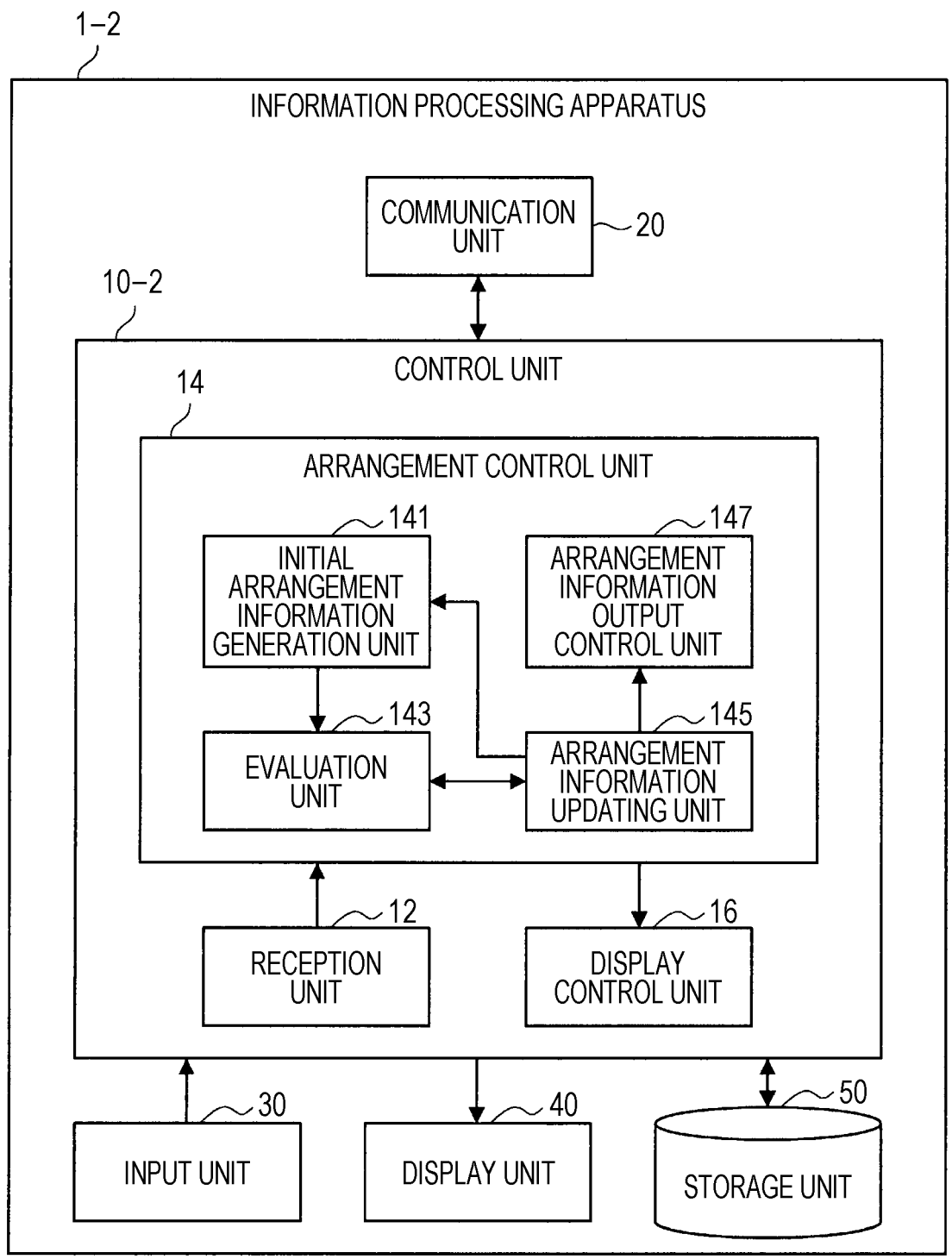
FIG. 7 is a block diagram illustrating a configuration example of an information processing apparatus 1-2 according to the embodiment.

FIG. 7 is a block diagram illustrating a configuration example of the information processing apparatus 1-2 according to the present embodiment. As illustrated in FIG. 7, the information processing apparatus 1-2 according to the present embodiment includes a control unit 10-2, a communication unit 20, an input unit 30, a do splay unit 40, and a storage unit 50. The configuration of the information processing apparatus 1-2 according to the present embodiment is similar to the configuration of the information processing apparatus 1 according to the first embodiment described with reference to FIG. 2 except that the function of the control unit 10-2 partially differs from the function of the control unit 10. Accordingly, a description of portions similar to those of the first embodiment is properly omitted and a portion of the control unit 10-2 different from the function of the control unit 10 is mainly described below.

The control unit 10-2 controls each configuration of the information processing apparatus 1-2. Furthermore, as illustrated in FIG. 7, the control unit 10-2 also functions as a reception unit 12, an arrangement control unit 14, and a display control unit 16.

The reception unit 12, similarly to the reception unit 11 according to the first embodiment, receives the user's input via the input unit 30. For example, the reception unit 12, similarly to the reception unit 11 according to the first embodiment, receives a projection condition with regard to projection by the projector 7, and outputs the projection condition to the arrangement control unit 14.

Moreover, the reception unit 12 according to the present embodiment receives an imaging condition (sensing condition) related to imaging (an example of sensing) by the camera 8 (an example of the sensor) and outputs the imaging condition to the arrangement control unit 14.

The imaging condition received by the reception unit 12 may include a plurality of imaging condition parameters. The imaging condition may include imaging condition parameters, for example, camera specification information, usable camera number information, camera arrangeable range information, and desired imaging resolution information.

The camera specification information is information associated with the specification of the camera 8. Tale camera specification information may include information, for example, the size, the number of imaging pixels, zoomable range of the camera 8.

The usable camera number information is information associated with the number of usable cameras. The usable camera number information may be, for example, information of the number of cameras 8 of the projection system 2000. Furthermore, the usable camera number information may be information of an upper limit value, a lower limit value, or a combination thereof of the number of usable cameras.

The camera arrangeable range information is information indicating a range in which the camera 8 can be arranged.

The desired imaging resolution information is information indicating a lower limit value desired by the user with regard to the resolution (pixel density) of a range of a captured image obtained by imaging (sensing) by the camera 8 corresponding to the desired projection range. That is, it is assumed that the user's wish is satisfied when the minimum value of the resolution in the range corresponding to the desired projection range of the captured image is equal to or more than the lower limit value. Note that the desired imaging resolution information may be specified, for example, by the format of the number of pixels of the captured image per unit area on the screen 9 or may be specified by the format of the number of pixels of the captured image per unit angle when the screen 9 is viewed from the viewing position.

The reception unit 12 receives the aforementioned imaging condition parameter on the basis of the user's input via the input unit 30. For example, the aforementioned imaging condition parameter may be received through direct input by the user, or the imaging condition parameter may be received by being selected by the user from preliminarily prepared options related to the imaging condition parameter. Note that the options related to the imaging condition parameter may, for example, be stored in the storage unit 50 or may be acquired from a different apparatus, which is not illustrated, via the communication unit 20.

Furthermore, it is sufficient if the reception unit 12 receives an imaging condition including at least some imaging condition parameter of the aforementioned imaging condition parameters. That is, not all the aforementioned imaging condition parameters may be specified.

Furthermore, the reception unit 12 receives a change with regard to the aforementioned imaging condition parameter or an additional imaging condition parameter on the basis of the user's input via the input unit 30. For example, the reception unit 12, as will be described later, may receive a change with regard to the imaging condition parameter or an additional imaging condition parameter when the imaging state obtained through a simulation based on the camera arrangement information is displayed on the display unit 40.

Similarly to the arrangement control unit 13 according to the first embodiment, the arrangement control unit 14 automatically designs arrangement of the projector 7 on the basis of the projection condition the reception unit 12 has received, and outputs the projector arrangement information associated with the designed arrangement of the projector 7.

Moreover, the arrangement control unit 14 according to the present embodiment further outputs camera arrangement information (sensor arrangement information) associated with the arrangement of the camera 8 on the basis of the imaging condition and the projection condition received by the reception unit 12 and the projector arrangement information. Note that in the present specification, "outputting the camera arrangement information" can include that the camera arrangement information is output to the display control unit 16, the camera arrangement information is output to the storage unit 50, and the camera arrangement information is output to a different apparatus via the communication unit 20.

The arrangement control unit 14 according to the present embodiment, as illustrated in FIG. 2, functions as an initial arrangement information generation unit 141, an evaluation unit 143, an arrangement information updating unit 145, and an arrangement information output control unit 147. The initial arrangement information generation unit 141, the evaluation unit 143, the arrangement information updating unit 145, and the arrangement information output control unit 147 have functions respectively similar to those of the initial arrangement information generation unit 131, the evaluation unit 133, the arrangement information updating unit 135, and the arrangement information output control unit 137 according to the first embodiment described with reference to FIG. 2, and further have functions described below.

The initial arrangement information generation unit 141 generates camera arrangement information on the basis of the imaging condition. The camera arrangement information generated by the initial arrangement information generation unit 141 may include information, e.g., the number of cameras 8, the position, the direction, and the zoom rate of each camera 8. Note that the number of cameras 8, the position, the direction, and the zoom rate of each camera 8 can be collectively called the camera arrangement parameter below.

Note that the camera arrangement information generated by the initial arrangement information generation unit 141 is so-called tentative camera arrangement information and may not satisfy all the aforementioned imaging conditions. The initial arrangement information generation unit 141 may generate the projector arrangement information such that a condition regarding some imaging condition parameter of the imaging conditions (e.g., usable camera number information, camera specification information, and camera arrangeable range information) is satisfied.

For example, the initial arrangement information generation unit 141 may generate camera arrangement information as to the camera 8 randomly arranged within the camera arrangeable range. Alternatively, the initial arrangement information generation unit 141 may generate the camera arrangement information as to the camera 8 arranged in a position according to a predetermined rule (e.g., the position directly opposite to the screen 9). The camera arrangement information generated by the initial arrangement information generation unit 141 is provided to the evaluation unit 143. Note that because the projector arrangement information is necessary for evaluation of the camera arrangement information by the evaluation unit 143, which will be described later, the initial arrangement information generation unit 141 may generate the camera arrangement information, for example, after the arrangement information updating unit 145 completes update of the projector arrangement information.

The evaluation unit 143 evaluates the camera arrangement information and specifies the evaluation value regarding the camera arrangement information on the basis of the imaging condition, the projection condition, and the projector arrangement information. The evaluation unit 143 may specify the evaluation value regarding the camera arrangement information such that the evaluation value regarding the camera arrangement information becomes a predetermined value in a case where all the imaging conditions are satisfied when the camera 8 is arranged according to the camera arrangement information. For example, the evaluation unit 143 may specify the camera arrangement information evaluation value such that the closer to a state in which the imaging condition is satisfied, the larger the evaluation value regarding the camera arrangement information, and in the above case the aforementioned predetermined value becomes a possible maximum value of the evaluation value.

The evaluation unit 143 may specify an evaluation value regarding the camera arrangement information further on the basis of some imaging condition parameter of the projection conditions, the projector arrangement information, and the imaging condition and the shooting state information obtained through a simulation using the camera arrangement information. The above simulation may use, for example, among the imaging conditions, the camera specification information. Furthermore, the above simulation may be performed by the evaluation unit 143 or may be performed by a different function block. The imaging state information is information indicating a simulation result obtained through a simulation with regard to a state in which the camera 8 images (senses) a projection image in a case where the camera 8 is arranged according to the camera arrangement information.

The imaging state information may include, for example, information indicating a simulation result with regard to the resolution of a captured image obtained by imaging by the camera 8, and the evaluation unit 143 may specify an evaluation value $E_{C_r}$ regarding the resolution of the captured image on the basis of the simulation result. The evaluation unit 143 may specify the evaluation value $E_{C_r}$ by evaluating the simulation result on the basis of the desired projection range information included in the projection conditions and the desired imaging resolution information included in the imaging conditions.

For example, the evaluation unit 143 may specify a minimum resolution in the desired projection range of the captured image on the basis of the simulation result and may specify the evaluation value $E_{Cr}$ such that the higher the minimum resolution the larger than evaluation value $E_{Cr}$. Note that in a case where a region not captured (sensed) by the camera 8 is present in the desired projection range, the minimum resolution is zero. Furthermore, the evaluation unit 143 may specify an evaluation value $E_{Cr}$ such that the evaluation value $E_{Cr}$ becomes the maximum value $E_{Cr}'$ in a case where the specified minimum resolution is equal to or more than the desired imaging resolution.

When the evaluation value $E_{Cr}$ is specified as described above, in a case where the evaluation value $E_{Cr}$ is the maximum value $E_{Cr}'$, the condition regarding the desired projection resolution information of the imaging conditions is satisfied.

The imaging state information may include, for example, information indicating a simulation result with regard to crossing between a beam incident on the camera 8 and a subject other than the screen 9 (projection surface), and the evaluation unit 143 may specify the evaluation value $E_{Cc}$ regarding the crossing on the basis of the simulation result. Note that the subject other than the screen 9 that can cross the beam incident on the camera 8 can include, for example, a camera 8 other than the camera 8 that receives the beam, and the projector 7. Furthermore, in a case where it is assumed that a viewer/listener is present when sensing is performed with the camera 8, the subject other than the screen 9 that can cross the beam incident on the camera 8 can include a viewer/listener present in the viewing position. The simulation with regard to the crossing between the beam incident on the camera 8 and these subjects can be performed on the basis of the projector specification information included in the projection condition, the camera specification information included in the imaging condition, and the viewing position information.

For example, the evaluation unit 143 may specify the evaluation value $E_{Cc}$ on the basis of the simulation result such that the larger the crossing region between the beam incident on the camera 8 and the subject other than the screen 9 (projection surface), the smaller the evaluation value $E_{Cc}$. Furthermore, the evaluation unit 143 may specify the evaluation value $E_{Cc}$ such that the evaluation value $E_{Cc}$ becomes the maximum value $E_{Cc}'$ in a case where the crossing region is not present.

The evaluation unit 143 may specify the evaluation value $E_C$ regarding the camera arrangement information by combining the aforementioned evaluation value $E_{Cr}$ and evaluation value $E_{Cc}$. For example, the evaluation unit 143 may specify the evaluation value $E_C$ using Formula (3) below.

$$E_C = w_{Cr} E_{Cr} + w_{Cc} E_{Cc} \quad (3)$$

Note that, in Formula (3), $w_{Cr}$ and $w_{Cc}$ are predetermined weighting factors for the evaluation value $E_{Cr}$ and the evaluation value $E_{Cc}$, respectively, and are used for balancing influences of the evaluation values.

Furthermore, in a case where the camera arrangement information satisfies all the imaging conditions, the evaluation value $E_C$ regarding the projector arrangement information matches a predetermined maximum value $E_C'$ expressed by Formula (4) below.

$$E_C' w_{Cr} E_{Cr}' + w_{Cc} E_{Cc}' \quad (4)$$

The arrangement information updating unit 145 updates the camera arrangement information on the basis of the evaluation value $E_C$ regarding the camera arrangement information. For example, the arrangement information updating unit 145 determines whether or not the evaluation value $E_C$ specified by the evaluation unit 143 matches the predetermined maximum value $E_C'$, and updates the camera arrangement information until the evaluation value $E_C$ matches the predetermined maximum value $E_C'$. Note that the arrangement information updating unit 145 may update the projector arrangement information such that, among the imaging conditions, the conditions regarding the usable camera number information, the camera specification information, and the camera arrangeable range information are satisfied.

Note that the update of the camera arrangement information can be performed in a manner substantially similar to the update of the projector arrangement information described in the first embodiment, and therefore a detailed description is omitted here. For example, the projector arrangement information, the projector arrangement parameter, the evaluation value $E_P$, and the maximum value $E_P'$ with regard to the update of the projector arrangement information are replaced respectively with the camera arrangement information, the camera arrangement parameter, the evaluation value $E_C$, and the maximum value $E_C'$ such that the update of the camera arrangement information can be performed.

The arrangement information output, control unit 147 controls output of the camera arrangement information. For example, the arrangement information output control unit 147, in a case where the arrangement information updating unit 145 determines that the evaluation value $E_C$ matches the predetermined maximum value $E_C'$, may output the camera arrangement information regarding the evaluation value $E_C$. With the above configuration, the camera arrangement information that satisfies all the projection conditions is output.

As described above, the arrangement information output control unit 147 may output the camera arrangement information to the display control unit 15. Furthermore, the arrangement information output control unit 147 may output the camera arrangement information to a different apparatus (e.g., the projection control apparatus 3-2 illustrated in FIG. 6) via the communication unit 20. Furthermore, the arrangement information output control unit 147 may output the projector arrangement information to the storage unit 50 (i.e., the projector arrangement information may be stored in the storage unit 50).

Note that the arrangement information output control unit 147, in a case where the evaluation value $E_C$ matches the predetermined maximum value EC' and the user satisfies the camera arrangement information according to the evaluation value $E_C$, may output the camera arrangement information to a different apparatus via the communication unit 20. Furthermore, similarly, the arrangement information output control unit 147, in a case where the evaluation value $E_C$ matches the predetermined maximum value $E_C'$ and the user is satisfied with the camera arrangement information regarding the evaluation value $E_C$, may output the camera arrangement information to the storage unit 50. Note that whether or not the user is satisfied with the camera arrangement information regarding the evaluation value $E_C$ may be determined on the basis of the information input by the user, who has checked the display (to be described later) of the display unit 40 based on the camera arrangement information, via the input unit 30.

With the above configuration, the camera arrangement information that satisfies all the imaging conditions and satisfies the user is output to a different apparatus or the storage unit 50 as the finally obtained (designed) camera arrangement information.

Similarly to the display control unit 15 according to the first embodiment described with reference to FIG. 2, the display control unit 16 controls the display unit 40 and causes the display unit 40 to display various screens. For example, similarly to the display control unit 15 according to the first embodiment, the display control unit 16 may cause a projection state, which is obtained through a simulation based on the projector arrangement information, to be displayed.

Moreover, the display control unit 16 according to the present embodiment may cause an imaging state obtained through a simulation based on the camera arrangement information, to be displayed. For example, the display control unit 16 may cause a visualization screen, which visualized an imaging state, to be displayed. Note that the above simulation and visualization may be performed by the display control unit 16 or may be performed by a different function block.

Figure 8:
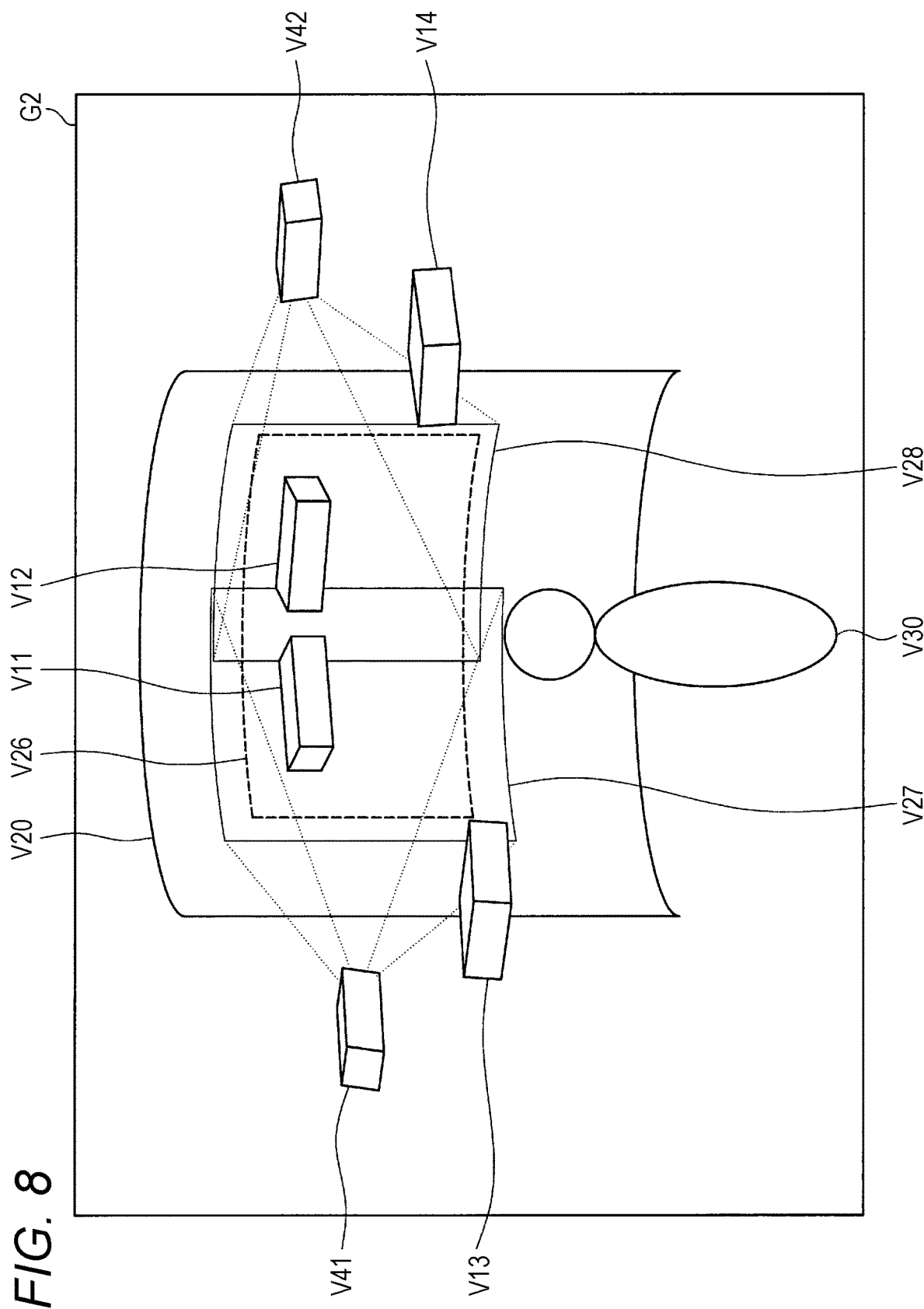
FIG. 8 is an explanatory view illustrating an example of a visualization screen including an imaging state displayed by a display control unit 16 according to the embodiment on a display unit 40.

FIG. 8 is an explanatory view illustrating an example of a visualization screen including an imaging state displayed by the display control unit 16 on the display unit 40. As illustrated in FIG. 8, visualization screen G2 includes screen 720 (corresponding to the screen 9 illustrated in FIG. 6) by projectors V11 to V14 (respectively corresponding to the projectors 7A to 7D illustrated in FIG. 6) and cameras V41 and V42 (respectively corresponding to the cameras 8A and 8B illustrated in FIG. 6). Furthermore, the visualization screen G2 includes a desired projection range V26. Moreover, the visualization screen G2 also includes imaging range V27 of the camera V41 and imaging range V28 of the camera V42. With the above configuration, the user can check whether the desired projection range is fully sensed (captured).

Note that the screen displayed by the display control unit 16 is not limited to the example illustrated in FIG. 8. For example, the display control unit 16 may cause information associated with the imaging state (e.g. information as to the minimum resolution or presence or absence of the crossing region described above) to be displayed by text. Furthermore, the display control unit 16 may cause the projection images V21 to V24 described with reference to FIG. 3 to be included on the visualization screen G2 and displayed so as to cause the screen with which it is possible to simultaneously check the projection state and the imaging state, to be displayed. Moreover, the display control unit 16 may cause a screen with which it is possible to check the presentation of a sensing pattern from the camera 8 in a case where sensing is performed with Structured light, to be displayed.

<2-3. Operation>

Heretofore, a configuration example of the information processing apparatus 1-2 according to the present embodiment has been described. Next, an operation example of the information processing apparatus 1-2 according to the present embodiment is described. Flow of an overall operation of the information processing apparatus 1-2 is described with reference to FIG. 9, and then flow of automatic camera arrangement design processing by the arrangement control unit 14 is described in detail with reference to FIG. 10.

(Overall Operation)

Figure 9:
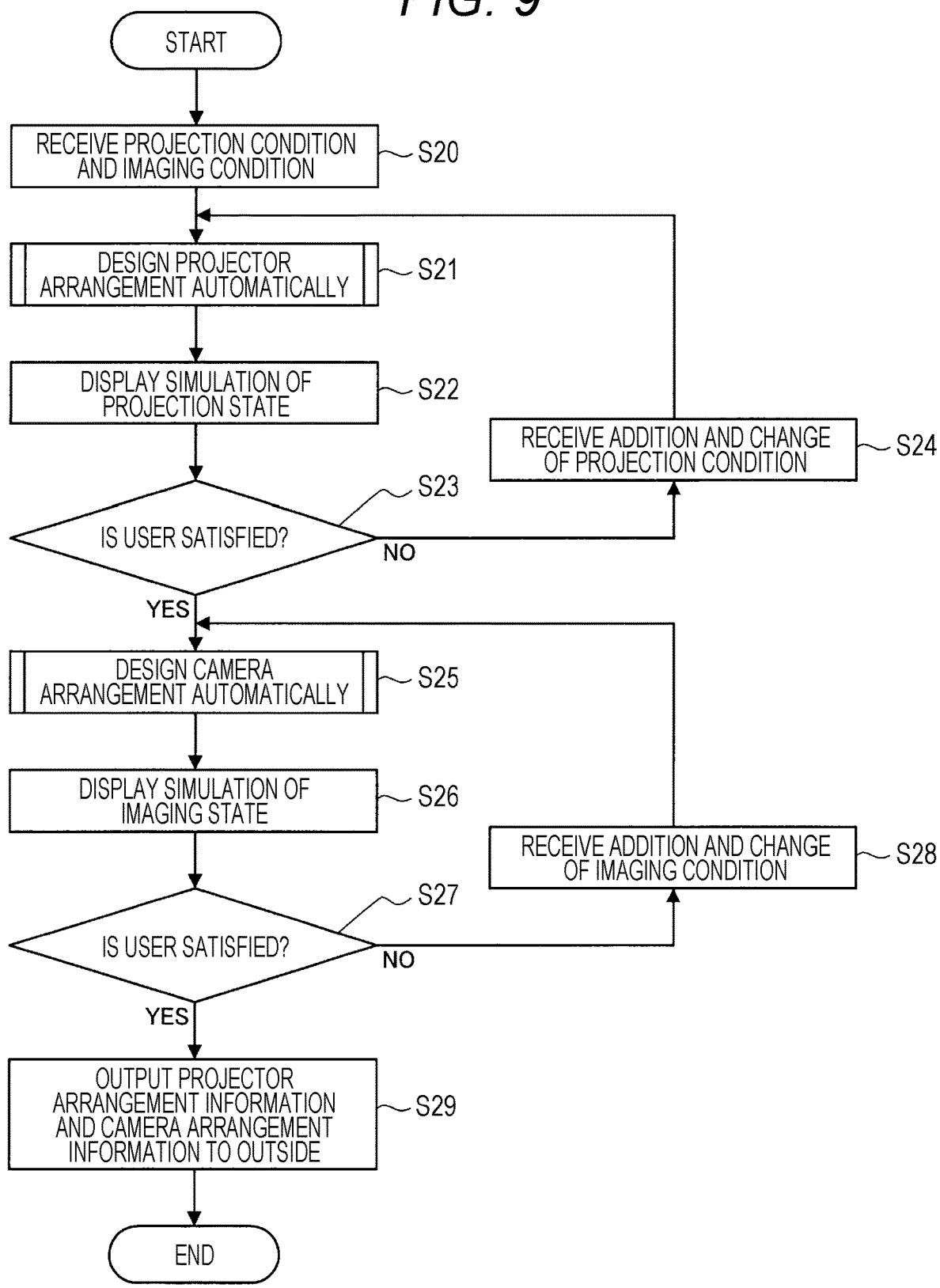
FIG. 9 is a flowchart illustrating an overall operation of the information processing apparatus 1-2 according to the embodiment.

FIG. 9 is a flowchart illustrating an overall operation of the information processing apparatus 1-2 according to the present embodiment.

As illustrated in FIG. 9, first, the reception unit 12 receives the projection condition and the imaging condition on the basis of the user's input via the input unit 30 (S20).

The processing of subsequent steps S21 to S24 is substantially the same as the processing of step S11 to S14 described with reference to FIGS. 4 and 5, and therefore a detailed description is omitted here.

In a case where the user is satisfied in step S23 (YES in S23), the processing proceeds to step S25. In step S25, on the basis of the imaging condition received in step S20, the arrangement control unit 14 performs automatic camera arrangement design (S25). Note that the processing of step S25 (automatic camera arrangement design processing) will be described later in detail with reference to FIG. 10.

Next, a screen including an imaging state obtained through a simulation based on the camera arrangement information output from the arrangement control unit 14 as a result of the automatic design performed in step S25 is caused to be displayed on the display unit 40 by the display control unit 16 (S26). The user who has checked the screen including the imaging state displayed on the display unit 40 in step S26 selects whether or not the user is satisfied by manipulating the input unit 30 (S27).

In a case where the user is not satisfied (NO in S27), the reception unit 12 receives a change with regard to the imaging condition parameter or an additional imaging condition parameter (S28). In step S27, it is expected that change or addition is performed with regard to the imaging condition parameter corresponding to a portion that is determined to be unsatisfactory by the user. Note that the processing after step S28 returns to step S25, and the automatic camera arrangement design is performed again on the basis of the changed or added imaging condition parameter.

Meanwhile, in a case where the user is satisfied (YES in S27), the arrangement information output control unit 147 controls the communication unit 20 and outputs the projector arrangement information and the camera arrangement information to a different apparatus (outside) (S29). The projector arrangement information and the camera arrangement information output to the outside may be used, for example, when the projector 7 and the camera 8 illustrated in FIG. 6 are arranged (set up) in practice. Furthermore, the projector arrangement information and the camera arrangement information output to the outside may be used when the projection control apparatus 3 illustrated in FIG. 1 performs the correction processing.

(Automatic Camera Arrangement Design Processing)

Figure 10:
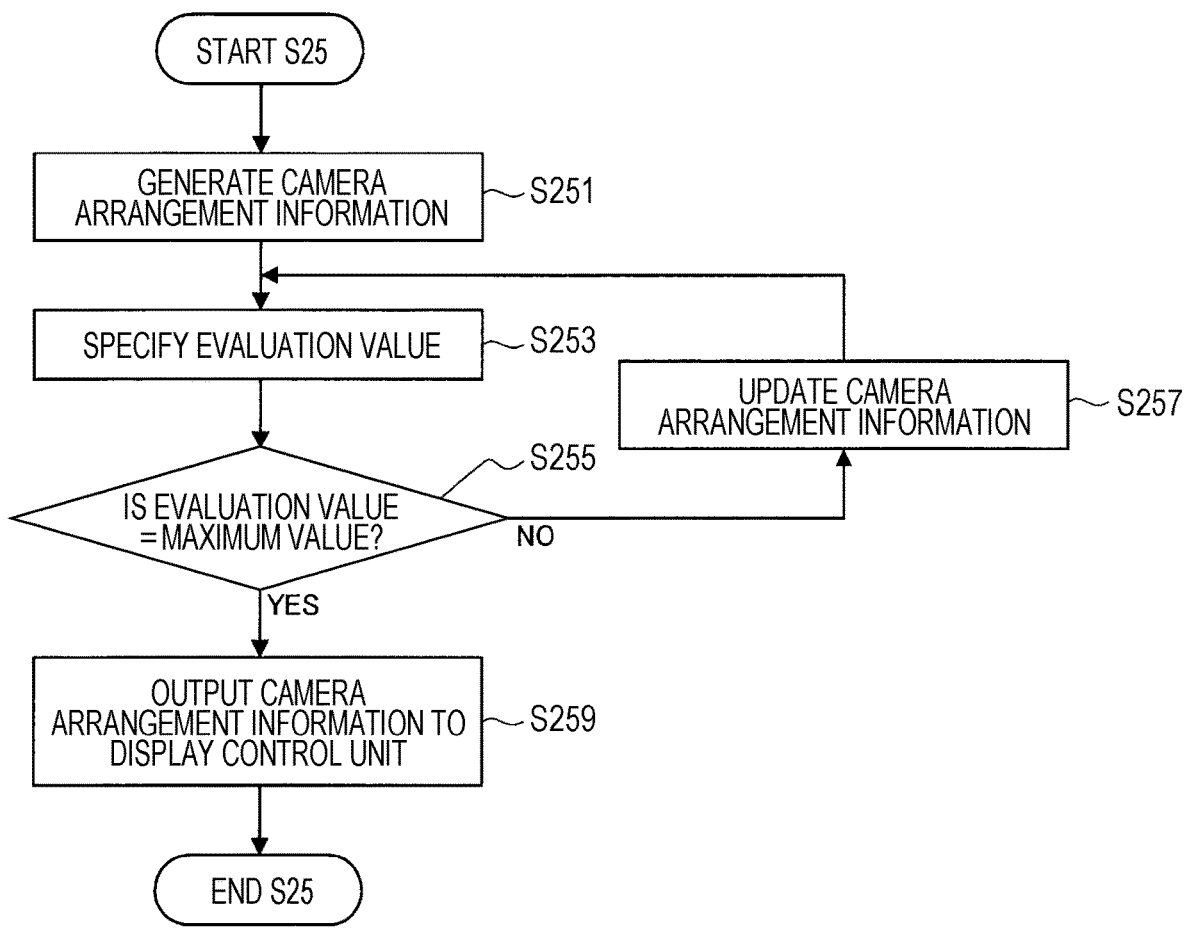
FIG. 10 is a flowchart illustrating flow of automatic camera arrangement design processing by an arrangement control unit 14 according to the embodiment.

Heretofore, the flow of the overall operation of the information processing apparatus 1-2 according to the present embodiment has been described. Next, the processing of step S25 illustrated in FIG. 9 (automatic camera arrangement design processing) is described in more detail with reference to FIG. 10. FIG. 10 is a flowchart illustrating flow of the automatic camera arrangement design processing by the arrangement control unit 14.

As illustrated in FIG. 10, first, the initial arrangement information generation unit 141 of the arrangement control unit 14 generates the camera arrangement information (S251). Next, the evaluation unit 143 of the arrangement control unit 14 specifies the evaluation value $E_C$ regarding the camera arrangement information (S253).

Next, the arrangement information updating unit 145 of the arrangement control unit 14 determines whether or not the evaluation value $E_C$ specified in step S253 matches the predetermined maximum value $E_C'$ (S255). In a case where the evaluation value $E_C$ does not match the predetermined maximum value $E_C'$ (NO in S255), the arrangement information updating unit 145 updates the camera arrangement information (S257), the processing returns to step S253, and the evaluation value $E_C$ regarding the updated camera arrangement information is specified. That is, the arrangement information updating unit 145 repeats updating the camera arrangement information until the evaluation value $E_C$ matches the predetermined maximum value $E_C'$.

Meanwhile, in a case where the evaluation value $E_C$ matches the predetermined maximum value $E_C'$ (YES in S255), the arrangement information output control unit 147 of the arrangement control unit 14 outputs the camera arrangement information to the display control unit 16 (S259).

<2-4. Effect>

Heretofore, the second embodiment of the present disclosure has been described. According to the present embodiment, in addition to the arrangement of the projector, even the arrangement of the camera for sensing used for the correction processing can also be automatically designed, and a burden on the user is further alleviated.

3. Hardware Configuration

Figure 11:
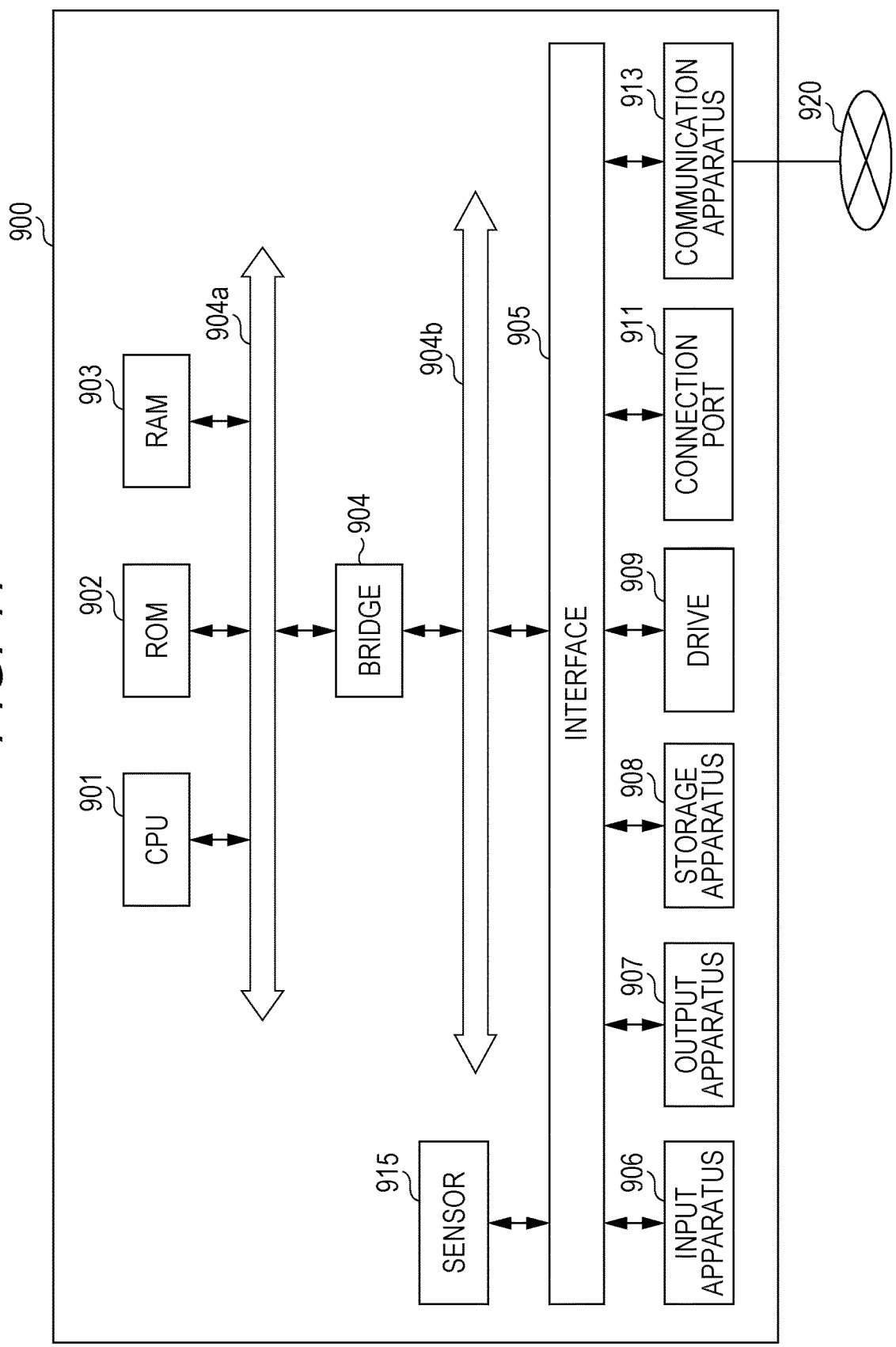
FIG. 11 is a block diagram illustrating an example of a hardware configuration.

Heretofore, the embodiments of the present disclosure have been described. Finally, a hardware configuration of the information processing apparatus according to the embodiments of the present disclosure is described with reference to FIG. 11. FIG. 11 is a block diagram illustrating an example of a hardware configuration of the information processing apparatus according to the embodiments of the present disclosure. Note that the information processing apparatus 900 illustrated in FIG. 11 can achieve, for example, the information processing apparatus 1 and the information processing apparatus 1-2 illustrated in FIGS. 2 and 7, respectively. The information processing by the information processing apparatus 1 and the information processing apparatus 1-2 is achieved according to a cooperation between software and hardware described below.

As illustrated in FIG. 11, the information processing apparatus 900 includes a central processing unit (CPU) 901, a read only memory (ROM) 902, a random access memory (RAM) 903, and a host bus 904a. Furthermore, the information processing apparatus 900 includes a bridge 904, an external bus 904b, an interface 905, an input apparatus 906, an output apparatus 907, a storage apparatus 908, a drive 909, a connection port 911, a communication apparatus 913, and a sensor 915. The information processing apparatus 900 may include a processing circuit such as a DSP or an ASIC instead of the CPU 901 or along therewith.

The CPU 901 functions as an arithmetic processing apparatus and a control apparatus and controls general operations in the information processing apparatus 900 according to various programs. Furthermore, the CPU 901 may be a microprocessor. The ROM 902 stores a program, an arithmetic parameter, or the like the CPU 901 uses. The PAM 903 temporarily stores a program used in execution of the CPU 901, a parameter that properly changes in the execution, or the like. The CPU 901 can form, for example, the control unit 10 and the control unit 10-2.

The CPU 901, the ROM 902, and the RAM 903 are connected to one another by the host bus 904a including a CPU bus and the like. The host bus 904a is connected to the external bus 904b, e.g., a peripheral component interconnect/interface (PCI) bus via the bridge 904. Note that it is not necessarily needed to separately configure the host bus 904a, the bridge 904, and the external bus 904b, and these functions may be mounted on a single bus.

The input apparatus 906 is achieved by an apparatus through which a user inputs information, such as a mouse, a keyboard, a touch panel, a button, a microphone, a switch, and a lever. Furthermore, the input apparatus 906 may be, for example, a remote control apparatus using infrared ray or other electric waves or external connection equipment such as a cellular phone or a PDA corresponding to manipulation of the information processing apparatus 900. Moreover, the input apparatus 906 may include, for example, an input control circuit or the like which generates an input signal on the basis of information input by the user using the aforementioned input means and outputs the input signal to the CPU 901. The user of the information processing apparatus 900 may input various types of data or give an instruction of processing operation with respect to the information processing apparatus 900 by manipulating the input apparatus 906.

The output apparatus 907 is formed by an apparatus that can visually or aurally notify the user of acquired information. As such devices, there is a display apparatus such as a CRT display apparatus, a liquid crystal display apparatus, a plasma display apparatus, an EL display apparatus, or a lamp, a sound output apparatus such as a speaker and a headphone, a printer apparatus, and the like. The output apparatus 907 outputs, for example, results acquired through various processing performed by the information processing apparatus 900. Specifically, the display apparatus visually displays results acquired through various processing performed by the information processing apparatus 900 in various forms such as text, images, tables and graphs. On the other hand, the sound output apparatus converts audio signals including reproduced sound data, acoustic data and the like into analog signals and aurally outputs the analog signals. The output apparatus 907 can form, for example, the display unit 40.

The storage apparatus 908 is an apparatus for data storage, formed as an example of the storage unit of the information processing apparatus 900. For example, the storage apparatus 908 is achieved by a magnetic storage apparatus such as an HDD, a semiconductor storage apparatus, an optical storage apparatus, a magneto-optical storage apparatus or the like. The storage apparatus 908 may include a storage medium, a record apparatus that records data on the storage medium, a read apparatus that reads data from the storage medium, a removal apparatus that removes data recorded on the storage medium, or the like. The storage apparatus 908 stores programs and various types of data executed by the CPU 901, various types of data acquired from the outside and the like. The storage apparatus 908 can form, for example, the storage unit 50.

The drive 909 is a storage medium reader/writer, and is mounted on the information processing apparatus 900 internally or externally. The drive 909 reads information recorded on a removable storage medium, e.g., a magnetic disk, an optical disk, a magneto-optical disk, or a semiconductor memory, which is mounted, and outputs the information to the RAM 903. Furthermore, the drive 909 can write information onto the removable storage medium.

The connection port 911 is an interface connected with external equipment and is a connector to the external equipment through which data can be transmitted, for example, through a universal serial bus (USE) and the like.

The communication apparatus 913 is, for example, a communication interface including a communication device or the like for connection to a network 920. The communication apparatus 913 is, for example, a communication card or the like for a wired or wireless local area network (LAN), long term evolution (LTE), Bluetooth (registered trademark) or wireless USB (WNSB). Furthermore, the communication apparatus 913 may be a router for optical communication, a router for asymmetric digital subscriber line (ADSL), various communication modems or the like. For example, the communication apparatus 913 can transmit and receive signals and the like to/from the Internet and other communication equipment according to a predetermined protocol, for example, TCP/IP or the like. The communication apparatus 913 can form, for example, the communication unit 20.

The sensor 915 is various kinds of sensors such as, for example, an acceleration sensor, a gyro sensor, a geomagnetic sensor, an optical sensor, a sound sensor, a distance measuring sensor, and a force sensor. The sensor 915 acquires information associated with a state of the information processing apparatus 900 itself such as attitude and moving speed of the information processing apparatus 900 and information associated with a surrounding environment of the information processing apparatus 900 such as brightness and noise around the information processing apparatus 900. Furthermore, the sensor 915 may include a GPS sensor which receives a GPS signal to measure latitude, longitude and altitude of the apparatus.

Note that the network 920 is a wired or wireless transmission path of information transmitted from apparatuses connected to the network 920. For example, the network 920 may include a public network, e.g., the Internet, a telephone network, or a satellite communication network, or various local area networks (LAN) including Ethernet (registered trademark), wide area networks (WAN), or the like. Furthermore, the network 920 may include a dedicated network, e.g., an internet protocol-virtual private network (IP-VPN).

Heretofore, an example of the hardware configuration capable of achieving the functions of the information processing apparatus 900 according to the embodiments of the present disclosure is indicated. The respective components may be implemented using universal members, or may be implemented by hardware specific to the functions of the respective components. Accordingly, according to a technical level at the time when the embodiments of the present disclosure are performed, it is possible to appropriately change the hardware configuration to be used.

Note that a computer program for achieving each of the functions of the information processing apparatus 900 according to the embodiments of the present disclosure described above may be created, and may be mounted in a PC or the like. Furthermore, it is also possible to provide a computer readable recording medium storing such a computer program. The recording medium is, for example, a magnetic disk, an optical disk, a magneto-optical disk, a flash memory, or the like. Furthermore, the above computer program may be delivered via a network, for example, without using a recording medium.

4. Conclusion

As described above, according to the embodiments of the present disclosure, the burden related to projector arrangement design can be alleviated. Therefore, even in a case where a large number of projectors is used or even in the case of a complicated projection condition, the projector arrangement can be easily designed.

Furthermore, even a user who has insufficient projector arrangement design experience can easily design projector arrangement. Moreover, according to the embodiments of the present disclosure, the number of projectors or the number of cameras required for achieving desired projection can be easily understood before preparation of real devices.

The preferred embodiment s) of the present disclosure has/have been described above with reference to the accompanying drawings, while the technical scope of the present disclosure is not limited to the above examples. It is apparent that a person having normal knowledge in the technical field of the present disclosure may find various alterations and modifications within the scope of the technical idea stated in the claims, and it should be understood that they will naturally come under the technical scope of the present disclosure.

For example, in the above description, a description is given of the case where the evaluation value is specified such that the more the projection condition or the imaging condition is satisfied, the larger the evaluation value and the evaluation value becomes the maximum value (predetermined value) in a case where all the conditions are satisfied, but the present technology is not limited to the above example. The evaluation value may be specified such that the more the projection condition or the imaging condition is satisfied the smaller the evaluation value, and the evaluation value becomes the minimum value (predetermined value) in a case where all the conditions are satisfied. Note that, in the above case, for update of the projector arrangement information or the camera arrangement information, it is sufficient if a change such as a large and small comparison is inverted is properly performed.

Furthermore, in the aforementioned embodiments, a description is given of the case where, in a case where the user is not satisfied with the projector arrangement information or the camera arrangement information, input of changing or adding a projection condition or an imaging condition is received, but the present technology is not limited to the above example. For example, in a case where the user is not satisfied with the projector arrangement information or the camera arrangement information, input of directly changing a projector arrangement parameter or a camera arrangement parameter included in the projector arrangement information or the camera arrangement information may be received. With the above configuration, the number of times of checking by the user can be reduced, and particularly a burden on the user who has rich design experience can be further alleviated.

Furthermore, the effects described in this specification are merely illustrative or exemplified effects, and are not limitative. That is, with or in the place of the above effects, the technology according to the present disclosure may achieve other effects that are clear to those skilled in the art from the description of this specification.

Note that the configuration below falls within the technical scope of the present disclosure.

(1)

An information processing apparatus including: an arrangement control unit that outputs projector arrangement information associated with arrangement of a projector on the basis of a projection condition related to projection by the projector.

(2)

The information processing apparatus according to (1), in which the arrangement control unit evaluates the projector arrangement information on the basis of the projection condition, specifies an evaluation value regarding the projector arrangement information, and updates the projector arrangement information on the basis of the evaluation value.

(3)

The information processing apparatus according to (2), in which the arrangement control unit, in a case where the projection condition is satisfied, specifies the evaluation value such that the evaluation value regarding the projector arrangement information becomes a predetermined value, and updates the projector arrangement information such that a difference between the evaluation value and the predetermined value becomes smaller.

(4)

The information processing apparatus according to (2) or (3), in which the arrangement control unit updates the projector arrangement information through genetic manipulation.

(5)

The information processing apparatus according to (3) or (4), in which the arrangement control unit updates the projector arrangement information until the evaluation value matches the predetermined value, and outputs the projector arrangement information in a case where the evaluation value matches the predetermined value.

(6)

The information processing apparatus according to any one of to (5), in which the arrangement control unit specifies the evaluation value further on the basis of projection state information obtained through a simulation using the projector arrangement information.

(7)

The information processing apparatus according to (6), in which the projection state information includes information indicating a simulation result related to resolution of a projection image projected by the projector.

(8)

The information processing apparatus according to (6) or (7), in which the projection state information includes information indicating a simulation result related to luminance of a projection image projected by the projector.

(9)

The information processing apparatus according to any one of (6) to (8), in which the projection state information includes information indicating a simulation result related to crossing between a beam emitted from the projector and a subject other than a projection surface.

(10)

The information processing apparatus according to any one of (1) to (9), in which the arrangement control unit further outputs sensor arrangement information associated with arrangement of a sensor on the basis of a sensing condition related to sensing by the sensor that senses at least a part of a projection image by the projector, the projection condition, and the projector arrangement information.

(11)

The information processing apparatus according to (10), in which the arrangement control unit evaluates the sensor arrangement information, specifies an evaluation value, and updates the sensor arrangement information on the basis of the projection condition, the projector arrangement information, and the sensing condition.

(12)

The information processing apparatus according to (11), in which the arrangement control unit specifies the evaluation value on the basis of sensing state information obtained through a simulation based on the projector arrangement information and the sensor arrangement information.

(13)

The information processing apparatus according to any one of (1) to (12), further including a display control unit that causes a projection state obtained through a simulation using the projector arrangement information, to be displayed.

(14)

An information processing method including: outputting, by a processor, projector arrangement information associated with arrangement of a projector on the basis of a projection condition related to projection by the projector.

(15)

A program causing a computer to achieve a function of:
outputting, by a processor, projector arrangement information associated with arrangement of a projector on the basis of a projection condition related to projection by the projector.

REFERENCE SIGNS LIST 1, 1-2 Information processing apparatus
3, 3-2 Projection control apparatus
5 Communication network
7 Projector
8 Camera
9 Screen
10, 10-2 Control unit
11, 12 Reception unit
13, 14 Arrangement control unit
15, 16 Display control unit
20 Communication unit
30 Input unit.
40 Display unit
50 Storage unit
131, 141 Initial arrangement information generation unit
133, 143 Evaluation unit
135, 145 Arrangement information updating unit
137, 147 Arrangement information output control unit
1000, 2000 Projection system

The invention claimed is:

1. An information processing apparatus comprising:
an arrangement control unit that
outputs projector arrangement information associated with arrangement of a projector on a basis of a projection condition related to projection by the projector,
outputs sensor arrangement information associated with arrangement of a sensor that senses the projection condition on a basis of a sensing condition related to sensing by the sensor,
evaluates the sensor arrangement information on the basis of the sensing condition,
specifies a sensor arrangement evaluation value regarding the sensor arrangement information, and
updates the sensor arrangement information on the basis of the sensor arrangement evaluation value,
wherein the arrangement control unit is implemented via at least one processor.

2. The information processing apparatus according to claim 1, wherein the arrangement control unit evaluates the projector arrangement information on the basis of the projection condition, specifies a projector arrangement evaluation value regarding the projector arrangement information, and updates the projector arrangement information on a basis of the projector arrangement evaluation value.

3. The information processing apparatus according to claim 2, wherein the arrangement control unit, in a case where the projection condition is satisfied, specifies the projector arrangement evaluation value such that the projector arrangement evaluation value regarding the projector arrangement information becomes a predetermined value, and updates the projector arrangement information such that a difference between the projector arrangement evaluation value and the predetermined value becomes smaller.

4. The information processing apparatus according to claim 2, wherein the arrangement control unit updates the projector arrangement information through genetic manipulation.

5. The information processing apparatus according to claim 3, wherein the arrangement control unit updates the projector arrangement information until the projector arrangement evaluation value matches the predetermined value, and outputs the projector arrangement information in a case where the projector arrangement evaluation value matches the predetermined value.

6. The information processing apparatus according to claim 2, wherein the arrangement control unit specifies the projector arrangement evaluation value further on a basis of projection state information obtained through a simulation using the projector arrangement information.

7. The information processing apparatus according to claim 6, wherein the projection state information includes information indicating a simulation result related to resolution of a projection image projected by the projector.

8. The information processing apparatus according to claim 6, wherein the projection state information includes information indicating a simulation result related to luminance of a projection image projected by the projector.

9. The information processing apparatus according to claim 6, wherein the projection state information includes information indicating a simulation result related to crossing between a beam emitted from the projector and a subject other than a projection surface.

10. The information processing apparatus according to claim 1, wherein the sensor further senses at least a part of a projection image by the projector and the projector arrangement information.

11. The information processing apparatus according to claim 10, wherein the arrangement control unit further updates the sensor arrangement information on the basis of the projection condition, the projector arrangement information, and the sensing condition.

12. The information processing apparatus according to claim 11, wherein the arrangement control unit specifies the sensor arrangement evaluation value on a basis of sensing state information obtained through a simulation based on the projector arrangement information and the sensor arrangement information.

13. The information processing apparatus according to claim 1, further comprising
a display control unit that causes a projection state obtained through a simulation using the projector arrangement information, to be displayed,
wherein the display control unit is implemented via at least one processor.

14. An information processing method comprising:
outputting, by a processor, projector arrangement information associated with arrangement of a projector on a basis of a projection condition related to projection by the projector;
outputting, by the processor, sensor arrangement information associated with arrangement of a sensor that senses the projection condition on a basis of a sensing condition related to sensing by the sensor;
evaluating, by the processor, the sensor arrangement information on the basis of the sensing condition;
specifying, by the processor, a sensor arrangement evaluation value regarding the sensor arrangement information; and
updating, by the processor, the sensor arrangement information on the basis of the sensor arrangement evaluation value.

15. A non-transitory computer-readable medium having embodied thereon a program, which when executed by a computer causes the computer to execute a method, the method comprising:
outputting projector arrangement information associated with arrangement of a projector on a basis of a projection condition related to projection by the projector;
outputting sensor arrangement information associated with arrangement of a sensor that senses the projection condition on a basis of a sensing condition related to sensing by the sensor;
evaluating the sensor arrangement information on the basis of the sensing condition;
specifying a sensor arrangement evaluation value regarding the sensor arrangement information; and
updating the sensor arrangement information on the basis of the sensor arrangement evaluation value.

* * * * *